US011624037B2

(12) United States Patent
Bai

(10) Patent No.: US 11,624,037 B2
(45) Date of Patent: Apr. 11, 2023

(54) PROCESS FOR PRODUCING SOLID BIOMASS FUEL

(71) Applicant: Hong Mei Bai, Fo Tan (CN)

(72) Inventor: Hong Mei Bai, Fo Tan (CN)

(*) Notice: Subject to any disclaimer, the term of this patent is extended or adjusted under 35 U.S.C. 154(b) by 0 days.

(21) Appl. No.: 17/414,262

(22) PCT Filed: Aug. 10, 2020

(86) PCT No.: PCT/GB2020/051905
§ 371 (c)(1),
(2) Date: Jun. 15, 2021

(87) PCT Pub. No.: WO2021/024001
PCT Pub. Date: Feb. 11, 2021

(65) Prior Publication Data
US 2022/0033727 A1 Feb. 3, 2022

(30) Foreign Application Priority Data
Aug. 8, 2019 (GB) .................. 1911374

(51) Int. Cl.
C10L 5/44 (2006.01)
C10L 9/08 (2006.01)
(Continued)

(52) U.S. Cl.
CPC ............. C10L 5/445 (2013.01); C10L 9/083 (2013.01); F23G 7/10 (2013.01); F23K 1/00 (2013.01);
(Continued)

(58) Field of Classification Search
CPC ............. C10L 9/083; C10L 2250/06; C10L 2290/06; C10L 2290/08; C10L 2290/28;
(Continued)

(56) References Cited

U.S. PATENT DOCUMENTS

| 2011/0089271 | A1* | 4/2011 | Werner | C10L 5/48 71/64.01 |
| 2013/0247456 | A1* | 9/2013 | Dale | C08L 97/005 44/535 |
| 2017/0000039 | A1 | 1/2017 | Liu et al. | |
| 2019/0119593 | A1* | 4/2019 | Hayashi | C10L 5/363 |

FOREIGN PATENT DOCUMENTS

| CN | 104263448 A | 1/2015 |
| CN | 104845696 A | 8/2015 |
| CN | 106753663 A | 5/2017 |
| CN | 107267246 A | 10/2017 |
| CN | 107286999 A | 10/2017 |

(Continued)

OTHER PUBLICATIONS

Onuegbu, et al., "Enhancing the efficiency of coal briquette in rural Nigeria using pennisetum purpurem," Advances in Natural and Applied Sciences, Sep. 1, 2010, all enclosed pages cited.

Primary Examiner — Latosha Hines
(74) Attorney, Agent, or Firm — Paul J. Roman, Jr.; Johnson, Marcou, Isaacs & Nix, LLC

(57) ABSTRACT

The present invention relates to a process for producing a solid biomass fuel from agricultural waste such as grass, rice husk, yam, straw, corn cob or any combination thereof, as well as a solid biomass fuel produced by said process. Additionally, the present invention relates to a combustion process comprising combusting said solid biomass fuel so as to produce energy and a pre-treatment process for pre-treating one or more sources of biomass for use in the production of a solid biomass fuel.

22 Claims, 24 Drawing Sheets

(51) Int. Cl.
  *F23G 7/10*    (2006.01)
  *F23K 1/00*    (2006.01)

(52) U.S. Cl.
  CPC ....... *C10L 2250/06* (2013.01); *C10L 2290/06* (2013.01); *C10L 2290/08* (2013.01); *C10L 2290/28* (2013.01); *C10L 2290/30* (2013.01); *C10L 2290/32* (2013.01); *C10L 2290/546* (2013.01); *F23G 2209/26* (2013.01); *F23G 2900/50206* (2013.01); *F23K 2201/101* (2013.01); *F23K 2201/1003* (2013.01); *F23K 2201/20* (2013.01)

(58) Field of Classification Search
  CPC ............. C10L 2290/30; C10L 2290/32; C10L 2290/546; F23G 7/10; F23G 2209/26; F23G 2900/50206; F23K 1/00; F23K 2201/1003; F23K 2201/101; F23K 2201/20
  See application file for complete search history.

(56) References Cited

FOREIGN PATENT DOCUMENTS

| | | | |
|---|---|---|---|
| CN | 107779235 A | | 3/2018 |
| CN | 108059990 A | | 5/2018 |
| CN | 108251175 A | | 7/2018 |
| CN | 108424800 A | | 8/2018 |
| CN | 109294676 A | | 2/2019 |
| CN | 109321301 A | * | 2/2019 |
| CN | 109321301 A | | 2/2019 |
| CN | 109370674 A | | 2/2019 |
| CN | 109370677 A | | 2/2019 |
| CN | 109370690 A | | 2/2019 |
| CN | 109609232 A | | 4/2019 |
| CN | 108300520 B | | 4/2020 |
| EP | 1443096 A1 | | 8/2004 |
| GB | 2506864 A | | 4/2014 |
| GB | 2586120 A | | 2/2021 |
| JP | 2016-141801 A | | 8/2016 |
| WO | 2019/053141 A1 | | 3/2019 |
| WO | 2020/229824 A1 | | 11/2020 |

* cited by examiner

The compression ratio: the ratio of the length to the diameter of the ring mold drain hole.

The compression ratio= length/diameter

PROCESS FOR PRODUCING SOLID BIOMASS FUEL

CROSS REFERENCE TO RELATED APPLICATIONS

This application is a U.S. national stage entry of PCT/GB2020/051905 filed Aug. 10, 2020, which claims priority to British application nos. 1911374.5 filed Aug. 8, 2019 and 1911446.1 filed Aug. 9, 2019, the entire contents of each of which are hereby incorporated by reference in their entirety.

FIELD OF THE INVENTION

The present invention relates to a process for producing a solid biomass fuel, as well as a solid biomass fuel produced by said process. Additionally, the present invention relates to a combustion process comprising combusting said solid biomass fuel so as to produce energy.

BACKGROUND OF THE INVENTION

Coal-fired power generation is used in power plants and industrial processes around the world. Coal and other fossil fuels are non-renewable energy resources. Over the last few decades, there have been calls to reduce the consumption of coal in coal-fired power stations and instead to use renewable resources for energy.

Fuels derived from biomass are an example of a renewable energy source that can be used to replace or at least partially replace coal. Biomass derived fuels can be burned in the presence of oxygen in power plants in combustion processes to produce energy. Biomass derived fuels can be combusted in traditional power plants originally designed for coal combustion, or biomass derived fuels can be combusted in power plants built specifically for biomass combustion. Certain forms of biomass can be mixed with coal and combusted in the same combustion process within a power plant. Such a process is known as coal co-firing of biomass. To be suitable for co-firing with coal, biomass derived fuel must typically have certain properties such as a certain level of quality and homogeneity with regard to properties. For example, biomass fuel comprised of particles of a homogenous size, density, moisture content etc. are particularly desirable in co-firing processes. It is also desirable that the biomass fuel contains a low level of ash. Levels of ash in biomass derived fuels are typically higher than those found in coal.

Various processes for producing solid biomass fuels from biomass sources are known. WO2014/087949 discloses a process for producing a solid biomass fuel in which a source of biomass is steam exploded before being molded into biomass blocks which are then heated so as to form the biomass fuel. The aim of the process is to produce biomass fuel with sufficient handleability during storage and with reduced chemical oxygen demand (COD) in discharged water during storage. The biomass source used in the process is palm kernel shell.

WO2016/056608 builds upon the teaching of WO2014/087949, and discloses a process for manufacturing solid biomass fuel in which the steam explosion step is not required to produce the fuel. The process comprises a molding step in which a biomass source is crushed before being compressed and molded into biomass blocks, before the biomass blocks are heated. The biomass source taught for use in said process is trees such as douglas fir, hemlock, cedar, cypress, European red pine, almond old tree, almond shell, acacia xylem part, acacia bark, walnut shell, sago palm, empty fruit bunches, meranti and rubber.

WO2017/175733 discloses a similar process comprising a molding step in which a biomass source is crushed before being compressed and molded into biomass blocks, before the biomass blocks are heated. The process of WO2017/175733 is directed to providing biomass fuel which exhibits low disintegration and achieves reduced COD in discharged water when exposed to rain water. The source of the biomass to be used in the process is selected from the rubber tree, acacia, meranti, eucalyptus, teak and a mixture of larch, spruce and birch.

WO2019/069849 aims to provide a biomass fuel that is easy to transport and store and that is resistant to spontaneous combustion during storage. The biomass fuel is made by a process comprising a molding step in which a biomass source is crushed before being compressed and molded into biomass blocks, before the biomass blocks are heated. The biomass source for producing the fuel is selected from rubber trees, acacia trees, *radiata* pine, a mixture of larch, spruce and birch; and spruce, pine and fir.

WO2019/069860 discloses an apparatus for producing biomass solid fuel. The apparatus comprises a carbonisation furnace for carbonising a molded biomass product to obtain a biomass solid fuel. The apparatus further comprises a yield calculation unit, a temperature measurement unit and a control unit. The control unit controls the heat applied to the carbonisation furnace based upon the spontaneous combustion properties of the biomass fuel. The molded biomass product is formed by pulverising a biomass source into pellets, before molding said pellets into a molded biomass product. The biomass source is selected from the rubber tree, acacia, dipterocarp, radia pine, a mixture of larch, spruce and birch or a mixture of spruce, pine and firs.

WO2018/181919 discloses a different process to those discussed above for producing a solid biomass fuel. The process involves a step of hydrothermal carbonisation of biomass in which a biomass source is pressurised in hot water so as to carbonise the biomass. The process is reported to provide a biomass fuel with high grindability in high yield and with reduced manufacturing costs. The source of the biomass is selected from husks, palm kernel shell, coconut palm, bamboo, empty fruit bunches, apricots and aubergines.

WO2017/175737 discloses a cooling apparatus for cooling carbonised biomass. The apparatus improves the cooling efficiency of semi-carbonised molded biomass. The apparatus cools the biomass by spraying water thereon. The cooler comprises a vibration flat plate and a spraying section for spraying water on the flat plate. The biomass fuel is produced by the same processes as discussed above. The source of biomass for producing the biomass fuel is douglas fir, hemlock, cedar, cypress, European red pine, almond old tree, almond shell, acacia xylem part, acacia bark, walnut shell, sago palm, empty fruit bunches, meranti and the rubber tree.

Finally, WO2014/050964 discloses a process for improving the grindability of biomass such that it can be ground with coal. The process involves increasing the moisture content of ground wood biomass to between 10 to 50%; densifying the biomass to have a density of 0.55 g/cm³ or higher, before subjecting the biomass to torrefaction. The source of biomass includes wood chips, bark, wood shavings, and sawdust.

The inventors of the present invention have appreciated that the solid biomass fuels and processes for their production discussed in the above documents have various problems associated with them. For example, the biomass sources described in the above documents are all plants and trees that typically only occur naturally, and that are not easy to cultivate and harvest on a commercial scale. The inventors have appreciated that it would be advantageous to have a source of biomass that can be grown and harvested easily or that is available on a commercial scale. It would also be advantageous to have a source of biomass that can be grown and harvested such that the quality and specific characteristics of the biomass source can be controlled. It would also be advantageous to have an alternative biomass source that does not require extensive deforestation in order to provide sufficient amounts of the biomass source for use as fuel.

Additionally, it has been found by the inventors that the sources of biomass described in the above documents, all being comprised of wood and similar materials, when subjected to conventional pulverising techniques known in the art, form particles with a low degree of homogeneity. Furthermore, pulverising the biomass sources is expensive due to the nature of the wood and wood-like material being difficult to pulverise. The inventors of the present invention have appreciated that it would be advantageous to have a source of biomass that is more easily pulverised by conventional pulverising techniques known in the art, and that forms more homogenous sized particles when pulverised.

Additionally, it has been found by the inventors that solid biomass fuels prepared from the biomass sources discussed in the above documents and prepared by the processes in the above documents do not have sufficient water proof characteristics. Water proof characteristics are important for solid biomass fuels since they need to be dry (or at least sufficiently dry) when used in a combustion process (either on their own or when co-fired with coal). Biomass fuels are frequently exposed to moisture during storage or transportation (such as from rain water). Accordingly, biomass fuels with increased water proof capacity are desirable.

The present inventors have also appreciated that the biomass fuel production processes described in the above documents do not provide fuels with sufficient quality and uniformity. In particular, the processes discussed above do not provide sufficient control of the density of the biomass during the molding step.

SUMMARY OF THE INVENTION

The present invention addresses the problems discussed above associated with prior processes. It has been surprisingly found by the inventors of the present invention that certain sources of biomass that are useful in providing solid biomass fuels, can be grown and harvested on a commercial scale. In doing so, a fixed and constant source of biomass for the production of fuels can be provided in growth cycles. Additionally, growing and harvesting said sources of biomass on a commercial scale enables control of the quality and uniformity of the biomass source, for example by cultivation and breeding techniques.

Additionally, it has also been found by the inventors of the present invention that certain sources of biomass that are agricultural waste products can be used to produce solid biomass solid fuels.

In addition to the above, the inventors of the present invention have also found that biomass fuels with improved waterproof characteristics can be provided by modifying the molding and/or heating steps of the process. The adaptation and control of the molding and heating steps of the process of the invention has also been found to improve the quality and uniformity of the solid biomass fuel product, as well as impart certain physical characteristics to it that are highly preferable for use in a combustion process. Furthermore, the adaptation of the molding and heating steps has been found to increase the yield of the solid biomass fuel, and impart characteristics to the fuel that make it easier to transport and store. The inventors have found that the nature of the biomass source, and the specific features of the molding and heating step act together to provide a superior biomass fuel product for use in combustion processes over those known in the art.

According to a first aspect of the invention, there is provided a process for producing a solid biomass fuel, wherein the process comprises the following steps:

(i) providing one or more sources of biomass with an average particle diameter (D50) of from 30,000 µm to 60,000 µm and a moisture content of less than 50% by weight;

(ii) pulverising the one or more sources of biomass to provide a pulverised biomass powder with an average particle diameter (D50) of from 1000 µm to 20,000 µm;

(iii) compressing the pulverised biomass powder so as to provide a compressed biomass powder with a moisture content of less than 30% by weight;

(iv) drying the compressed biomass powder so as to provide a dried compressed biomass powder;

(v) molding the dried compressed biomass powder so as to provide a molded biomass product;

(vi) heating the molded biomass product to a temperature of from 160° C. to 420° C. for a time period of from 0.25 to 5 hours so as to provide a solid biomass fuel; and (vii) removing dust particles from the solid biomass fuel.

Typically, the one or more sources of biomass comprise grass, rice husk, yam, straw, corn cob, or any combination thereof. In an embodiment, the one or more sources of biomass comprise agricultural waste.

Typically, the one or more sources of biomass comprise grass in an amount of from 20% to 80% by weight, and one or more of rice husk, yam, straw, corn cob, or any combination thereof.

Preferably, the one or more sources of biomass comprise grass. More preferably, the one or more sources of biomass comprise a plant from the genus *Pennisetum*. Most preferably, the one or more sources of biomass comprise *Pennisetum sinese* Roxb.

In certain embodiments, the one or more sources of biomass comprise, consist of, or consist essentially of (i) grass such as a plant from the *Pennisetum* genus such as *Pennisetum sinese* Roxb; (ii) a mixture of rice husk and yam; (iii) a mixture of straw and yam; and (iv) a mixture of corn cob and yam.

Typically, step (i) of providing one or more sources of biomass with an average particle diameter (D50) of from 30,000 µm to 60,000 µm and a moisture content of less than 50% by weight, comprises (a) compressing the one or more sources of biomass so as to have a moisture content of less than 50% by weight; and/or (b) chopping the one or more sources of biomass so as to have an average particle diameter (D50) of from 30,000 µm to 60,000 µm; preferably wherein the process comprises both steps (a) and (b) and more preferably wherein the process comprises step (a) of compressing the one or more sources of biomass prior to step (b) of chopping the one or more sources of biomass.

Typically, the moisture content of the one or more sources of biomass is from 30% to 50% by weight.

Typically, step (iv) of drying the compressed biomass powder so as to provide a dried compressed biomass powder comprises drying the compressed biomass powder such that the dried compressed biomass powder has a moisture content of from 10% by weight to 18% by weight, preferably from 12% by weight to 15% by weight.

Typically, step (iv) of drying the compressed biomass powder so as to provide a dried compressed biomass powder further comprises mixing the compressed biomass powder particles whilst drying.

Typically, step (v) of molding the dried compressed biomass powder comprises adapting the molding step such that that density of the molded biomass product is controlled, optionally wherein adapting the molding step such that the density of the molded biomass product is controlled comprises controlling the compression ratio of a mold used in said molding step.

Typically, an additive is added to the dried compressed biomass powder prior to step (v) of molding the dried compressed biomass powder. Preferably, the additive increases the yield of the molded biomass product.

Typically, step (vi) of heating the molded biomass product is carried out for a time period of from 0.4 to 2.5 hours, and/or wherein the step of heating the molded biomass product comprises heating the molded biomass product to a temperature of from 180° C. to 350° C., optionally from 210° C. to 280° C.

Typically, step (vi) of heating the molded biomass product comprises heating the molded biomass product under conditions so as to induce torrefaction of the molded biomass product.

Preferably, step (vi) of heating the molded biomass product is adapted so as to control the uniformity of the solid biomass fuel, optionally wherein adapting step (vi) so as to control the uniformity of the solid biomass fuel comprises conducting step (vi) in an apparatus in which the molded biomass product is rotated whilst being heated, optionally, wherein adapting step (vi) so as to control the uniformity of the solid biomass fuel comprises controlling the speed or direction of rotation of the molded biomass product, optionally wherein the molded biomass product is rotated in the apparatus in both an anticlockwise and clockwise direction.

Typically, the process further comprises a step of cooling the solid biomass fuel after heating step (vi) and prior to step (vii) of removing dust particles from the solid biomass fuel.

Typically, step (vii) of removing dust particles from the solid biomass fuel comprises removing dust particles from the solid biomass fuel with a screen. Preferably, the screen has a pore size of from 3 mm to 8 mm, and preferably wherein the screen has a pore size of from 4 mm to 6 mm.

Typically, the bulk density of the solid biomass fuel as determined according to DIN EN 15103 is from 0.58 kg/l to 0.8 kg/l, preferably from 0.6 kg/l to 0.75 kg/l, and most preferably from 0.60 to 0.70 kg/l.

Typically, the mechanical durability of the solid biomass fuel as determined according to DIN EN 15210-1 is 95% or more, 96% or more, 97% or more, or 98% or more.

In some embodiments of the process, the one or more sources of biomass, and solid biomass fuel are as follows:

(i) the one or more sources of biomass comprise or consist essentially of grass such as a plant from the *Pennisetum* genus such as *Pennisetum sinese* Roxb, and wherein the solid biomass fuel has a bulk density of from 0.60 kg/L to 0.65 kg/L, and wherein the mechanical durability of the solid biomass fuel is 95% or higher;

(ii) the one or more sources of biomass comprise a mixture of rice husk and yam, wherein the solid biomass fuel has a bulk density of from 0.58 kg/L to 0.63 kg/L, and wherein the mechanical durability of the solid biomass fuel is 95% or more;

(iii) the one or more sources of biomass comprise a mixture of straw and yam, and wherein the solid biomass fuel has a bulk density of from 0.60 kg/L to 0.64 kg/L, and wherein the mechanical durability of the solid biomass fuel is 95% or higher;

(iv) the one or more sources of biomass comprise a mixture of corn cob and yam, and wherein the solid biomass fuel has a bulk density of from 0.62 kg/L to 0.66 kg/L, and wherein the mechanical durability of the solid biomass fuel is 95% or higher;

wherein the bulk density is determined according to DIN EN 15103, and wherein the mechanical durability is determined according to DIN EN 15210-1.

Typically, the total dry sulphur content of the biomass solid fuel is 0.15 wt % or less, preferably 0.12 wt % or less, and most preferably 0.10 wt % or less, wherein the total dry sulphur content is determined according to DIN EN 15289.

Typically, the total dry hydrogen content of the biomass solid fuel is 5 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel is 36 wt % or more, preferably from 38 wt % to 42 wt %, more preferably from 38 wt % to 40 wt %, wherein the total dry oxygen content is determined according to DIN EN 15296.

Typically, the total dry carbon content of the biomass solid fuel is 36 wt % or more, preferably from 38 wt % to 48 wt %, and more preferably from 39 wt % to 45 wt %, wherein total dry carbon content is determined according to DIN EN 15104.

Typically, the total dry nitrogen content of the biomass solid fuel is less than 0.8 wt %, preferably less than 0.7 wt % and more preferably less than 0.6 wt %, wherein the total dry nitrogen content is determined according to DIN EN 15104.

Typically, the solid biomass fuel is waterproof for up to 20 days, preferably up to 30 days, and more preferably up to 40 days.

Typically, the chemical oxygen demand (COD) of the solid biomass fuel when immersed in water is 5000 ppm or less, preferably 4000 ppm or less, and most preferably 3000 ppm or less, wherein the chemical oxygen demand is determined according to GB/11914-89

Typically, the fixed carbon content of the solid biomass fuel is 25 wt % or more, preferably from 28 wt % to 35 wt %, more preferably from 30 wt % to 33 wt %, wherein the fixed carbon content is determined according to DIN EN 51734

Typically, the ash content of the solid biomass fuel is less than 20 wt %, preferably less than 18 wt %, and most preferably less than 16 wt %, wherein the ash content is determined according to EN 14775 at 550° C.

Typically, the volatile matter content of the solid biomass fuel is from 42 wt % to 70 wt %, more preferably from 48 wt % to 75 wt %, wherein the volatile matter content is determined according to DIN EN 15148.

Typically, the solid biomass fuel has a moisture content of less than 8 wt %, preferably less than 7 wt %, most preferably less than 6 wt %, wherein the moisture content is determined according to DIN EN 14774.

Typically, the biomass solid fuel has a calorific value of from 4300 kcal/kg to 6500 kcal/kg, wherein the calorific value is determined in accordance with DIN EN 14918.

Typically, the bulk density of the molded biomass product is A, and the bulk density of the biomass solid fuel is B, and wherein B/A is 0.55 to 1, wherein the bulk density is determined in accordance with DIN EN 15103.

Typically, material derived from biomass is present in the solid biomass fuel in an amount of at least 95% by weight of the total fuel content of the solid biomass fuel.

According to a second aspect of the invention, there is provided a solid biomass fuel obtainable or obtained by a process according to any preceding claim.

According to a third aspect of the invention, there is provided a solid biomass fuel derived from one or more sources of biomass, wherein the one or more sources of biomass:

(i) comprise, consist of, or consist essentially of a plant from the *Pennisetum* genus such as *Pennisetum sinese* Roxb;

(ii) comprise, consist of, or consist essentially of a mixture of rice husk and yam;

(iii) comprise, consist of, or consist essentially of a mixture of straw and yam;

(iv) comprise, consist of, or consist essentially of a mixture of corn cob and yam;

(v) comprise, consist of, or consist essentially of a mixture of *Pennisetum sinese* Roxb and rice husk;

(vi) comprise, consist of, or consist essentially of a mixture of a plant from the *Pennisetum* genus such as *Pennisetum sinese* Roxb and straw; or (vii) comprise, consist of, or consist essentially of a mixture of a plant from the *Pennisetum* genus such as *Pennisetum sinese* Roxb and corn cob.

Typically, the one or more sources of biomass comprise grass, rice husk, yam, straw, corn cob, or any combination thereof. In an embodiment, the one or more sources of biomass comprise agricultural waste.

Typically, the one or more sources of biomass comprise grass in an amount of from 20% to 80% by weight, and one or more of rice husk, yam, straw, corn cob, or any combination thereof.

Preferably, the one or more sources of biomass comprise grass. More preferably, the one or more sources of biomass comprise a plant from the genus *Pennisetum*. Most preferably, the one or more sources of biomass comprise *Pennisetum sinese* Roxb.

In certain embodiments, the one or more sources of biomass comprise, consist of, or consist essentially of (i) grass such as a plant from the *Pennisetum* genus such as *Pennisetum sinese* Roxb; (ii) a mixture of rice husk and yam; (iii) a mixture of straw and yam; and (iv) a mixture of corn cob and yam.

Typically, the moisture content of the one or more sources of biomass is from 30% to 50% by weight.

Typically, the bulk density of the solid biomass fuel as determined according to DIN EN 15103 is from 0.58 kg/l to 0.8 kg/l, preferably from 0.6 kg/l to 0.75 kg/l, and most preferably from 0.60 to 0.70 kg/l.

Typically, the mechanical durability of the solid biomass fuel as determined according to DIN EN 15210-1 is 95% or more, 96% or more, 97% or more, or 98% or more.

In some embodiments of the process, the one or more sources of biomass, and solid biomass fuel are as follows:

(i) the one or more sources of biomass comprise or consist essentially of grass such as a plant from the *Pennisetum* genus such as *Pennisetum sinese* Roxb, and wherein the solid biomass fuel has a bulk density of from 0.60 kg/L to 0.65 kg/L, and wherein the mechanical durability of the solid biomass fuel is 95% or higher;

(ii) the one or more sources of biomass comprise a mixture of rice husk and yam, wherein the solid biomass fuel has a bulk density of from 0.58 kg/L to 0.63 kg/L, and wherein the mechanical durability of the solid biomass fuel is 95% or more;

(iii) the one or more sources of biomass comprise a mixture of straw and yam, and wherein the solid biomass fuel has a bulk density of from 0.60 kg/L to 0.64 kg/L, and wherein the mechanical durability of the solid biomass fuel is 95% or higher;

(iv) the one or more sources of biomass comprise a mixture of corn cob and yam, and wherein the solid biomass fuel has a bulk density of from 0.62 kg/L to 0.66 kg/L, and wherein the mechanical durability of the solid biomass fuel is 95% or higher;

wherein the bulk density is determined according to DIN EN 15103, and wherein the mechanical durability is determined according to DIN EN 15210-1.

Typically, the total dry sulphur content of the biomass solid fuel is 0.15 wt % or less, preferably 0.12 wt % or less, and most preferably 0.10 wt % or less, wherein the total dry sulphur content is determined according to DIN EN 15289.

Typically, the total dry hydrogen content of the biomass solid fuel is 5 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel is 36 wt % or more, preferably from 38 wt % to 42 wt %, more preferably from 38 wt % to 40 wt %, wherein the total dry oxygen content is determined according to DIN EN 15296.

Typically, the total dry carbon content of the biomass solid fuel is 36 wt % or more, preferably from 38 wt % to 48 wt %, and more preferably from 39 wt % to 45 wt %, wherein total dry carbon content is determined according to DIN EN 15104.

Typically, the total dry nitrogen content of the biomass solid fuel is less than 0.8 wt %, preferably less than 0.7 wt % and more preferably less than 0.6 wt %, wherein the total dry nitrogen content is determined according to DIN EN 15104.

Typically, the solid biomass fuel is waterproof for up to 20 days, preferably up to 30 days, and more preferably up to 40 days.

Typically, the chemical oxygen demand (COD) of the solid biomass fuel when immersed in water is 5000 ppm or less, preferably 4000 ppm or less, and most preferably 3000 ppm or less, wherein the chemical oxygen demand is determined according to GB/11914-89

Typically, the fixed carbon content of the solid biomass fuel is 25 wt % or more, preferably from 28 wt % to 35 wt %, more preferably from 30 wt % to 33 wt %, wherein the fixed carbon content is determined according to DIN EN 51734

Typically, the ash content of the solid biomass fuel is less than 20 wt %, preferably less than 18 wt %, and most preferably less than 16 wt %, wherein the ash content is determined according to EN 14775 at 550° C.

Typically, the volatile matter content of the solid biomass fuel is from 42 wt % to 70 wt %, more preferably from 48 wt % to 75 wt %, wherein the volatile matter content is determined according to DIN EN 15148.

Typically, the solid biomass fuel has a moisture content of less than 8 wt %, preferably less than 7 wt %, most preferably less than 6 wt %, wherein the moisture content is determined according to DIN EN 14774.

Typically, the biomass solid fuel has a calorific value of from 4300 kcal/kg to 6500 kcal/kg, wherein the calorific value is determined in accordance with DIN EN 14918.

Typically, the bulk density of the molded biomass product is A, and the bulk density of the biomass solid fuel is B, and wherein B/A is 0.55 to 1, wherein the bulk density is determined in accordance with DIN EN 15103.

Typically, material derived from biomass is present in the solid biomass fuel in an amount of at least 95% by weight of the total fuel content of the solid biomass fuel.

According to a fourth aspect of the invention, there is provided a combustion process comprising the step of combusting a solid biomass fuel in accordance with the second and third aspects of the invention so as to produce energy.

In one embodiment, the solid biomass fuel is co-fired and combusted alongside a fossil fuel. Preferably, the fossil fuel comprises coal.

In one embodiment, the PM1.0 emissions of the process are less than 175 mg/kg, and preferably less than 150 mg/kg.

According to a fifth aspect of the invention, there is provided the use of a solid biomass fuel according to the second and third aspects of the invention as a fuel in a combustion process.

Preferably, the combustion process comprises co-firing the solid biomass fuel alongside a fossil fuel. Preferably, the fossil fuel is coal.

In one embodiment, the PM1.0 emissions of the process are less than 175 mg/kg, and preferably less than 150 mg/kg.

According to a sixth aspect of the invention, there is provided the use of one or more sources of biomass to produce a solid biomass fuel, wherein the one or more sources of biomass: (i) comprise, consist of, or consist essentially of a plant from the *Pennisetum* genus such as *Pennisetum sinese* Roxb; (ii) comprise, consist of, or consist essentially of a mixture of rice husk and yam; (iii) comprise, consist of, or consist essentially of a mixture of straw and yam; (iv) comprise, consist of, or consist essentially of a mixture of corn cob and yam; (v) comprise, consist of, or consist essentially of a mixture of a plant from the *Pennisetum* genus such as *Pennisetum sinese* Roxb and rice husk; (vi) comprise, consist of, or consist essentially of a mixture of a plant from the *Pennisetum* genus such as *Pennisetum sinese* Roxb and straw; or (vii) comprise, consist of, or consist essentially of a mixture of a plant from the *Pennisetum* genus such as *Pennisetum sinese* Roxb and corn cob.

Preferably, the one or more sources of biomass are as described above in accordance with first and third aspects of the invention.

Preferably, the use comprises using the one or more sources of biomass in a process according to the first aspect of the invention.

Preferably, the solid biomass fuel is as described above in accordance with the first and third aspects of the invention.

According to a seventh aspect of the invention, there is provided a pre-treatment process for pre-treating one or more sources of biomass for use in the production of a solid biomass fuel, wherein the pre-treatment process comprises the following steps:

(i) providing one or more sources of biomass with an average particle diameter (D50) of from 30,000 μm to 60,000 μm and a moisture content of less than 50% by weight;

(ii) pulverising the one or more sources of biomass to provide a pulverised biomass powder with an average particle diameter (D50) of from 1000 μm to 20,000 μm;

(iii) compressing the pulverised biomass powder so as to provide a compressed biomass powder with a moisture content of less than 30% by weight; and (iv) drying the compressed biomass powder so as to provide a dried compressed biomass powder.

Typically, step (i) of providing one or more sources of biomass with an average particle diameter (D50) of from 30,000 μm to 60,000 μm and a moisture content of less than 50% by weight, comprises (a) compressing the one or more sources of biomass so as to have a moisture content of less than 50% by weight; and/or (b) chopping the one or more sources of biomass so as to have an average particle diameter (D50) of from 30,000 μm to 60,000 μm; preferably wherein the process comprises both steps (a) and (b) and more preferably wherein the process comprises step (a) of compressing the one or more sources of biomass prior to step (b) of chopping the one or more sources of biomass.

Typically, the moisture content of the one or more sources of biomass is from 30% to 50% by weight.

Typically, step (iv) of drying the compressed biomass powder so as to provide a dried compressed biomass powder comprises drying the compressed biomass powder such that the dried compressed biomass powder has a moisture content of from 10% by weight to 18% by weight, preferably from 12% by weight to 15% by weight.

Typically, step (iv) of drying the compressed biomass powder so as to provide a dried compressed biomass powder further comprises mixing the compressed biomass powder particles whilst drying.

Typically, the one or more sources of biomass are as discussed above in accordance with the first and third aspects of the invention.

Typically, the pre-treatment process is carried out prior to a process of producing a solid biomass fuel, wherein the process of producing a solid biomass fuel comprises a step of molding or heating the dried compressed biomass powder. Preferably, the process of producing a solid biomass fuel is as discussed above in accordance with the first aspect of the invention.

According to an eighth aspect of the invention, there is provided a post-treatment process for post-treating a solid biomass fuel, wherein the post treatment process comprises a step of removing dust particles from the solid biomass fuel.

Preferably, the step of removing dust particles from the solid biomass fuel comprises removing dust particles from the solid biomass fuel with a screen. More preferably, the screen has a pore size of from 3 mm to 8 mm, and preferably wherein the screen has a pore size of from 4 mm to 6 mm.

Typically, the step of removing dust particles from the solid biomass fuel comprises subjecting the solid biomass fuel to vibration, rotation, rolling, or any combination thereof.

Preferably, the post-treatment process is carried out after a process for producing a solid biomass fuel from one or more sources of biomass, wherein the process for producing a solid biomass fuel comprises a step of molding or heating. More preferably, the process for producing a solid biomass fuel is as discussed above in accordance with the first aspect of the invention.

Preferably, the solid biomass fuel is as discussed above in accordance with the second and third aspects of the invention.

BRIEF DESCRIPTION OF THE DRAWINGS

The present inventions will now be described by way of example and with reference to the accompanying Figures in which.

DETAILED DESCRIPTION OF THE INVENTION

Sources of Biomass

The one or more sources of biomass used in accordance with the present invention can be any of those discussed above. Typically, the one or more sources of biomass comprise agricultural waste. The term "agricultural waste" as used herein typically refers to plant-based waste products that are produced as a by-product of agricultural operations. For example, agricultural waste may comprise left over plant-based products that are harvested, or unwanted components of harvested plant-based products. The one or more sources of biomass preferably comprise grass. The grass may be agricultural waste that is produced as a by-product of agricultural operations, or left-over excess grass that has been grown for a specific purpose. Alternatively, the grass may be grown and harvested specifically for the purpose of being used as a source if biomass for solid biomass fuels. Alternatively, the grass may be naturally occurring grass.

Figure 1:
FIG. 1 is a photograph of the plant *Pennisetum sinese* Roxb.

A preferred form of grass for use in accordance with the present invention are plants from the genus *Pennisetum*. *Pennisetum* is a widespread genus of plants of the grass family that is native to tropical and temperate regions of the world. A preferred plant from the *Pennisetum* genus for use in accordance with the invention is the plant *Pennisetum sinese* Roxb. A photograph of the plant *Pennisetum sinese* Roxb is shown in FIG. 1.

Other sources of biomass that may be used in accordance with the present invention include rice husk, yam, straw and corn cob. These sources of biomass may be produced as agricultural waste as a by-product of an agricultural operation. Alternatively, these sources of biomass may be grown specifically for the purpose of being a feedstock for the preparation of biomass solid fuels. Corn cob is a particular example of a material that may be produced as agricultural waste. For example, corn may be grown and harvested for human consumption. When processing corn plants for human consumption, the process may involve removing the edible corn from the inedible corn cob. The corn cob is thus an agricultural waste product. In some embodiments, the one or more sources of biomass comprise, consist of, or consist essentially of rice husk, yam, straw, corn cob, or any combination thereof. For example, the one or more sources of biomass may comprise, consist of, or consist essentially of rice husk and yam; straw and yam; or corn cob and yam.

Where the one or more sources of biomass comprise grass and one or more additional sources of biomass, the one or more sources of biomass may contain any specific amount of the grass such as from 5 wt % to 95 wt %. Typically, where the one or more sources of biomass comprise grass and one or more additional sources of biomass, the grass is present in an amount of from 10% to 90% by weight, from 20% to 80% by weight, from 30% to 70% by weight, or from 40% to 60% by weight of the total amount of the one or more sources of biomass.

In certain embodiments, the one or more sources of biomass comprise, consist of or consist essentially of grass such as grass from the *Pennisetum* genus such as *Pennisetum sinese* Roxb in an amount of from 20% to 80% by weight, and straw, corn cob, rice husk or any combination thereof, in an amount of from 20% to 80% by weight.

Each of the one or more sources of biomass discussed above can be obtained or harvested by conventional methods known in the art.

The term "comprising" as used herein is used to mean that any further undefined component can be present. The term "consisting" as used herein is used to mean that no further components can be present, other than those specifically listed. The term "consisting essentially of" as used herein is used to mean that further undefined components may be present, but that those components do not materially affect the essential characteristics of the composition.

As discussed above, it has been found that the one or more sources of biomass used in the present invention can be grown and harvested on a commercial scale, providing increased control of the quality and specific characteristics of the biomass source compared to the materials used in the prior art. Use of said materials also avoids the environmental damage associated with using trees such as necessary deforestation. The above advantages are particularly associated with the use of grass, yams, corn cob and rice husk, and in particular with grass such as grasses of the genus *Pennisetum* such as *Pennisetum sinese* Roxb.

Use of the one or more sources of biomass used in the present invention has also surprisingly been found to be easier to grind than said prior used materials, such as wood. This reduces the costs of the grinding process. In particular, grasses do not need grinding to the same extent as prior used materials such as wood.

Use of the materials of the invention, when ground, also provides a more homogenous mix of particle sizes than said prior used materials. Without being limited by theory, this is believed to impart advantageous properties to the final solid fuel product, such as greater uniformity and continuousness of the biomass fuel products. This is desirable in combustion processes for a number of reasons.

The inventors of the present invention have appreciated that the uses of grasses is particularly useful as a source of biomass. In particular grasses from the *Pennisetum* genus such as *Pennisetum sinese* Roxb are particularly useful. It has been found that *Pennisetum sinese* Roxb is a fast growing, high yield hybrid grass. It is neither genetically modified nor an ecological risk to the surrounding environment when grown. It can grow under a variety of soil conditions and so would not compete with food crops for available land. Furthermore, *Pennisetum sinese* Roxb is a short-term fast growing crop that can be harvested in its first year after planting. In contrast, other crops such as switch grass, bamboo and various other crops have low yields and cannot be harvested until the second, third or fourth year after planting. It has been found that *Pennisetum sinese* Roxb can be harvested for biogas production at forty days after planting once it has grown to one metre in height, and then again every twenty five to thirty days. For production of biomass pellets and other forms of solid fuel such as in the process of the invention, it has been found that *Pennisetum sinese* Rob can be harvested 195 days after planting once it has grown to four metres in height, and then again every 120 days. The high growth rate of the plant thus provides a continuous growth source of biomass.

Despite the above described advantages associated with the use of grasses such as *Pennisetum sinese* Roxb and the other sources of biomass described above, the inventors have appreciated that a problem associated with the use of such sources of biomass is that they typically contain very high amounts of moisture. For example, typically, the moisture content of freshly harvested *Pennisetum sinese* Roxb when harvested in autumn or winter is above 70% by weight. This moisture content is too high for the source of biomass to be used directly in a molding or torrefaction process for producing solid biomass fuels. As such, it is necessary to reduce the moisture content of the source of biomass before such steps. Conventional drying processes may be used. However, a disadvantage associated with conventional drying processes such as drying in the sun is that the process takes a long time. Furthermore, due to uncertainty of weather, the ideal drying time may vary and is difficult to predict. When left to dry in the sun for extended periods of time, the biomass source may also decay, affecting final product quality when the biomass source is converted into a solid fuel. More technologically advanced drying process may be used, but said processes are typically expensive and reduce the economy of the overall process.

The inventors have thus appreciated that there is a need in the art for a process of manufacturing a solid biomass fuel using materials such as those discussed above, in which the moisture content of the sources of biomass is suitably and economically reduced before steps that convert the biomass source into solid biomass fuels such as heating and molding. In other words, the inventors have appreciated that there is a need in the art for a process of pre-treating one or more sources of biomass so as to reduce the moisture content of the biomass before said biomass sources are converted into biomass solid fuels. The above needs are provided by the process of the invention.

Providing One or More Sources of Biomass

As discussed above, the process of the invention comprises a step of providing one or more sources of biomass with an average particle diameter (D50) of from 30,000 µm to 60,000 µm and a moisture content of less than 50% by weight.

The one or more sources of biomass source may be reduced in size by standard techniques known in the art. The biomass may be reduced in size such that the biomass has an average particle diameter (D50) of from 30,000 µm to 60,000 µm such as an average particle diameter of from 40,000 µm to 50,000 µm.

Typically, the one or more sources of biomass are provided as particles with a size in the above range by being introduced into a conventional chipping apparatus, although this will of course be dependent upon the specific source of biomass. For example, if the source of biomass occurs naturally with particles having sizes in the above range, then chipping will not be necessary. In the case of *Pennisetum sinese* Roxb, this plant may be fed into conventional chipping devices known in the art to reduce the plant into particles of the size discussed above. Accordingly, in some embodiments, the process of the invention may comprise chopping the one or more sources of biomass so as to have an average particle diameter (D50) of from 30,000 µm to 60,000 µm.

Providing one or more sources of biomass with an average particle diameter (D50) of from 30,000 µm to 60,000 µm and a moisture content of less than 50% by weight may also comprise compressing the one or more sources of biomass. This compression step typically squeezes moisture from the one or more sources of biomass such that the moisture content of the one or more sources of biomass is reduced to less than 50% by weight. Accordingly, in preferred embodiments, the step of providing biomass with a particle size as discussed above comprises compressing one or more sources of biomass with a moisture content of more than 70% by weight such that after compression, the moisture content of the one or more sources of biomass is less than 50% by weight.

In preferred embodiments, the one or more sources of biomass once chipped and/or compressed may comprise from 30% by weight to 50% by weight of moisture, such as from 30% to 40% by weight or from 40% to 50% by weight, or from 30% to 45% by weight.

In preferred embodiments, the step of providing biomass with a particle size as discussed above comprises both a step of compressing the biomass and also a step of chipping the biomass.

Figure 23:
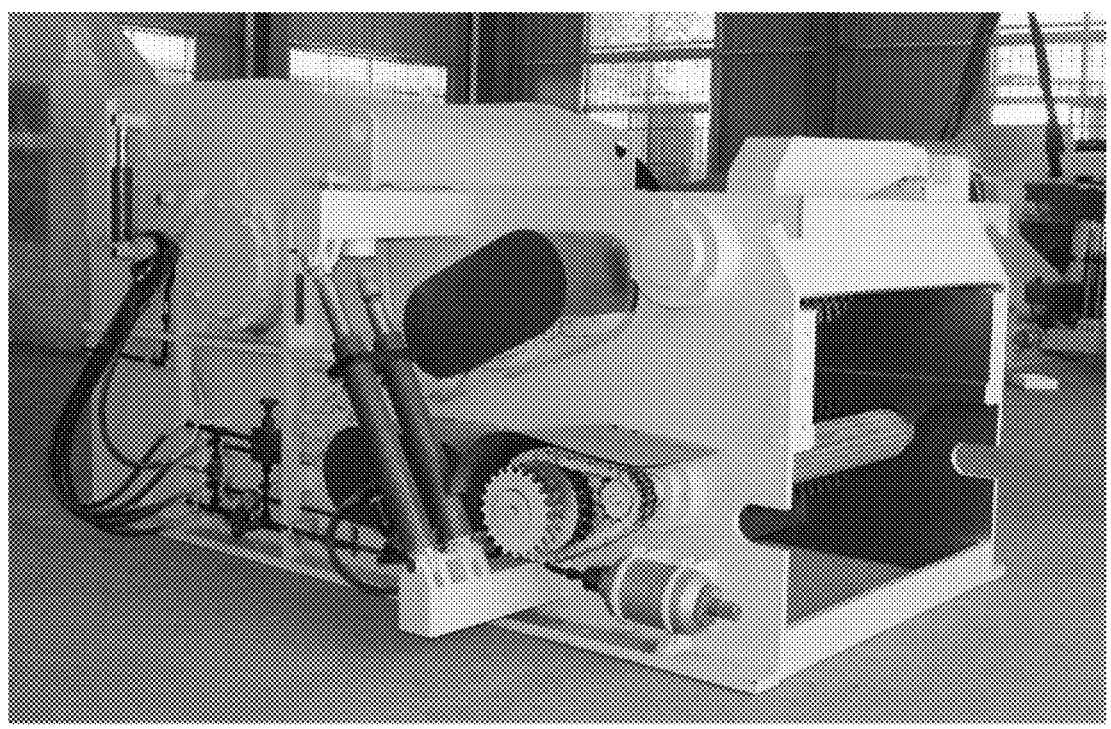
FIG. 23 is a photograph of an apparatus known in the art that can be used for chipping one or more sources of biomass.

The chipping step and compression step may be carried out using separate apparatus. Alternatively, the steps may be carried out in a single apparatus configured for both chipping and compressing the biomass. For example, a motorised rolling device suitable for compressing biomass may be placed on a conveyor belt that feeds a conventional chipping device. In this respect, the biomass source is compressed before it enters the chipper. Apparatus suitable for carrying out compression and chipping steps of the one or more sources of biomass are known in the art. An example of an apparatus used for chipping is shown in FIG. 23. Chipping apparatus such as those shown in FIG. 23 typically work on the principle of material entering the chipper via a conveying system such as conveyor belt that feeds material through a feeding port. The material is then cut into chips by a high-speed rotating blade (not shown) and a blade mounted on the base of the machine (not shown). The functioning of said mechanism and of similar chipping mechanisms are known to the person skilled in the art.

Figure 24:
FIG. 24 is a photograph of an apparatus known in the art that can be used for compressing one or more sources of biomass.

An example of an apparatus used for the compression step is shown in FIG. 24.

As discussed above, in some embodiments, a rolling device such as that shown in FIG. 24 can be positioned on a conveyor belt to compress source material before said source material enters a chipping device, such as that shown in FIG. 23.

Pulverisation of Biomass

Step (ii) comprises pulverising the one or more sources of biomass to provide a pulverised biomass powder with an average particle diameter (D50) of from 1000 μm to 20,000 μm.

The biomass source may be pulverised into a biomass powder by standard techniques known in the art. The biomass source may be pulverised such that the biomass powder has an average particle diameter (D50) of from 1000 μm to 20,000 μm. Typically, the one or more sources of biomass are pulverised to have an average particle diameter of from 1000 μm to 18,000 μm, 1000 μm to 15,000 μm, 1000 μm to 10,000 μm, or from 1,000 to 5000 μm. Alternatively, the biomass can be pulverised so as to have an average particle diameter of from 10,000 μm to 20,000 μm, 10,000 μm to 18,000 μm, or from 10,000 μm to 15,000 μm. As discussed above, pulverising the specific biomass sources for use in the present invention has been found to provide a biomass powder with an advantageous smaller particle size distribution than provided by grinding prior known biomass sources. This is particularly the case for grasses such as *Pennisetum sinese* Roxb.

Compression of Biomass Powder

Step (iii) comprises compressing the pulverised biomass powder so as to provide a compressed biomass powder with a moisture content of less than 30% by weight.

Figure 25:
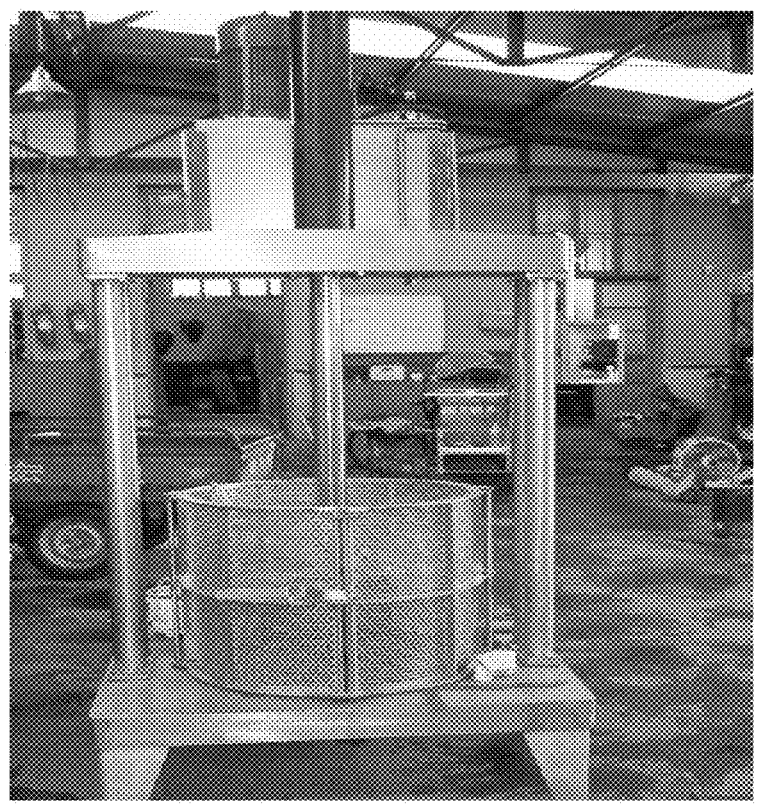
FIG. 25 is a photograph of an apparatus known in the art that can be used for compressing one or more sources of biomass.

This compression step may involve compressing the biomass powder using suitable apparatus known in the art. An example of such an apparatus is shown in FIG. 25. Such an apparatus operates by compressing the biomass powder with a hydraulic compression device. Material can be inserted into the meshed container shown in FIG. 25. The material may then be subjected to hydraulic compression with a hydraulic compression device causing water to exit the meshed container through the holes of the mesh.

Figure 26:
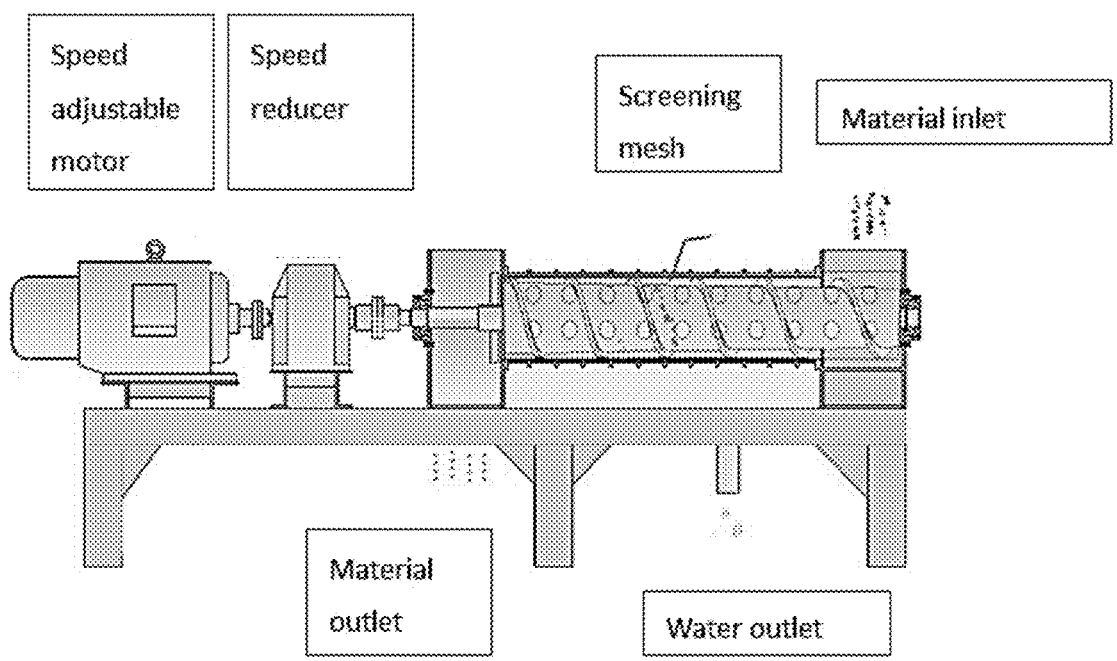
FIG. 26 is a photograph of an apparatus known in the art that can be used for compressing one or more sources of biomass.

Another apparatus that may be used to compress biomass powder is that shown in FIG. 26, which is a screw water squeezing machine. The material to be compressed is introduced into the spiral extrusion vessel. Moisture from the material is squeezed through the screen mesh by rotation of the motor-driven spiral screw.

It has been found that carrying out a compression step after the biomass has been pulverised as discussed above provides a compressed biomass powder with even lower water content. Typically, the moisture content of the compressed biomass powder is less than 30% by weight, such as less than 25% by weight or less than 20% by weight. The reduction in moisture of the biomass during the compression step is important since the biomass has a lower moisture content at the start of the subsequent drying step. The drying step is thus sped up since less moisture needs to be removed from the biomass.

It has been found that chipping and compressing biomass to have a particle size of from 30,000 μm to 60,000 μm and moisture content of less than 50% by weight; before pulverising said biomass to form a biomass powder, before then again compressing the biomass powder to form a compressed biomass powder having less than 30% by weight moisture is a more efficient and economical process in reducing the moisture content of the biomass than conducting steps in a different order or removing any of the steps. For example, it has been found that chipping and compressing the biomass to less than 50% by weight moisture prior to pulverisation results in a more effective pulverisation step. Likewise, carrying out these steps before the a subsequent compression step results in the biomass powder being compressed to an even lower moisture content than is possible to obtain by carrying out the process steps in a different order or by the omission of any particular step. Consequently, these steps in combination provide a compressed biomass powder product with a low level of moisture for the drying step, improving the efficiency and economy of the drying process.

Drying the Compressed Biomass Powder

The biomass is dried after in step (iv) of the process. Step (iv) of drying the compressed biomass powder so as to provide a dried compressed biomass powder comprises drying the compressed biomass powder such that the dried compressed biomass powder has a moisture content of from 10% by weight to 18% by weight, preferably from 12% by weight to 15% by weight.

The step of drying the biomass powder may also comprise mixing the compressed biomass powder with one or more additional sources of biomass. For example, where the one or more sources of biomass comprise at least two sources of biomass, whilst the two or more sources of biomass can be mixed during any step of the process of the invention, preferably the one or more sources of biomass are mixed during the drying step of the process of the invention. In some embodiments, the compressed biomass powder is mixed with an additional source of biomass that is also a compressed biomass powder prepared using the process steps described herein. In other embodiments, the one or more additional sources of biomass are not processed as described herein. For example, the compressed biomass powder prepared as described herein may be mixed with one or more additional sources of biomass that are prepared in different ways, such as pulverising without compression, or neither of these steps.

The compressed biomass powder may be dried using any suitable method, such as using standard drying cylinders known in the art. Preferably, the drying step is carried out in a drying apparatus that comprises a rotating drying drum. The rotation of the rotating drying drum can be used to mix the compressed biomass powder with one or more additional sources of biomass as described above. Preferably, the rotating drying drum comprises a lifting plate. The lifting plate continuously raises material while the drying cylinder rotates. It has surprisingly been found by the inventors of the present invention that the use of a rotating drying cylinder with a lifting plate results in improved mixing of the one or more biomass powders where the one or more biomass powders are being dried with additional materials, or where two or more biomass powders are being mixed.

Molding the Dried Compressed Biomass Powder

The dried compressed biomass powder is molded so as to provide a molded biomass product. The molding step may be carried out in any molding apparatus known in the art and in accordance with biomass molding techniques known in the art, and may include extrusion systems. Preferably, the molding step is carried out in a compression mold. Preferably, the compression mold comprises a mold product exit hole. The molding step may be carried out using an apparatus as described in CN105435708.

Preferably, the molding step comprises molding the dried compressed biomass powder into pellets. Accordingly, in a preferred embodiment, the molded biomass product and solid biomass fuel product comprises biomass pellets.

Whilst it is known to mold biomass powder to produce molded biomass products, the inventors of the present invention have surprisingly discovered that adapting the molding step such that the density of the molded biomass product produced from said step is controlled so as to be within a certain range imparts certain advantageous properties to the final solid biomass fuel product. Specifically, controlling the molding step such that the density of the molded biomass product is within the range of from 1.0 to 1.2 kg/L has been found to impart advantageous properties to the final biomass fuel product. Preferably, the molding step is controlled such that the density of the molded biomass product is from 1.0 kg/L to 1.2 kg/L.

The molding step may be controlled in a variety of ways. Where the molding process comprises the use of a compression mold, the density is controlled by using a compression ratio of from 3.8 to 6.5. Typically, the smaller the compression ratio, the lower the density of the molded biomass product. However, the higher the compression ratio, the lower the yield of the molded biomass product.

The compression ratio for a compression mold with a mold product exit hole may be defined as the ratio of the length to the diameter of the mold product exit hole.

Figure 2:
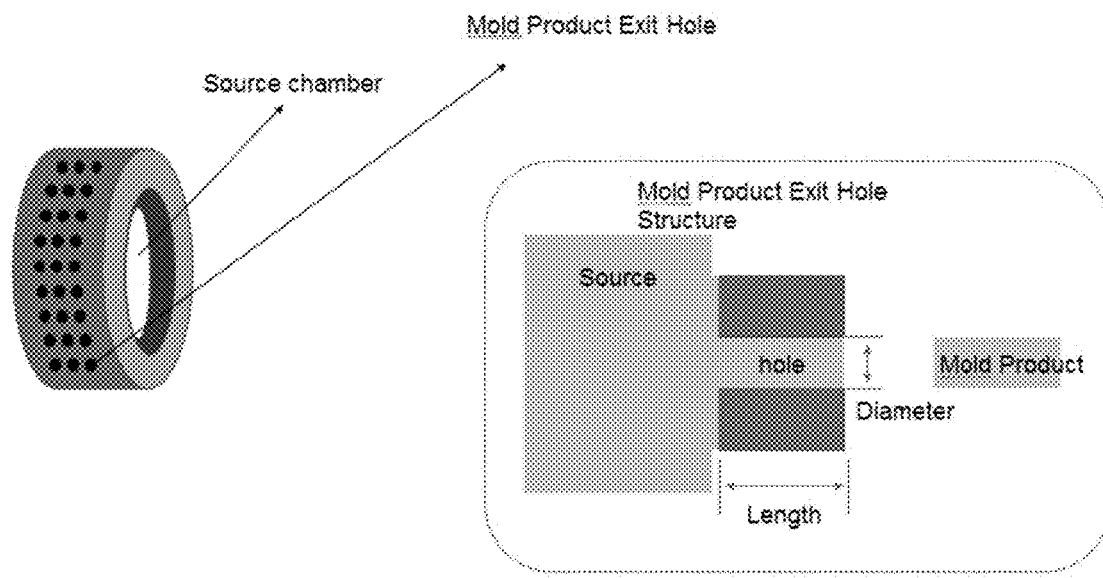
FIG. 2 is a diagram of a typical compression mold that may be used in accordance with the invention.

FIG. 2 shows an example of a compression mold that may be used in accordance with the present invention. The dried compressed biomass powder is inserted into the interior of the mold before being squeezed from inside the mold by pressure such that it exits the mold product exit hole in the Figure. The compression ratio is shown in the Figure as the ratio of the length of the product out hole to its diameter.

In the process of the invention, preferably, the step (v) of molding the dried compressed biomass powder comprises adapting the molding step such that that density of the molded biomass product is controlled to be within the range of from 1.1 kg/L to 1.2 kg/L. Preferably, the density is controlled by using a compression mold and controlling the compression ratio of the compression mold. More preferably, the compression ratio is from 3.8 to 6.5.

Controlling the density of the molded biomass product during the molding step has been found, surprisingly, to provide a final fuel product with increased water proof capacity. Preferably, the solid biomass fuel product produced from a molded biomass product with a density within the range of from 1.1 kg/L to 1.2 kg/L is sufficiently water proof for up to 20 days, and preferably up to 30 days.

Preferably, an additive is added to the dried compressed biomass powder prior to step (v) of molding the dried compressed biomass powder. Said additive is believed to improve the molding process and increase the yield of the molded biomass product produced from the molding step. Suitable additives are known in the art and include, but are not limited to starch, or starch derivatives.

Figure 3:
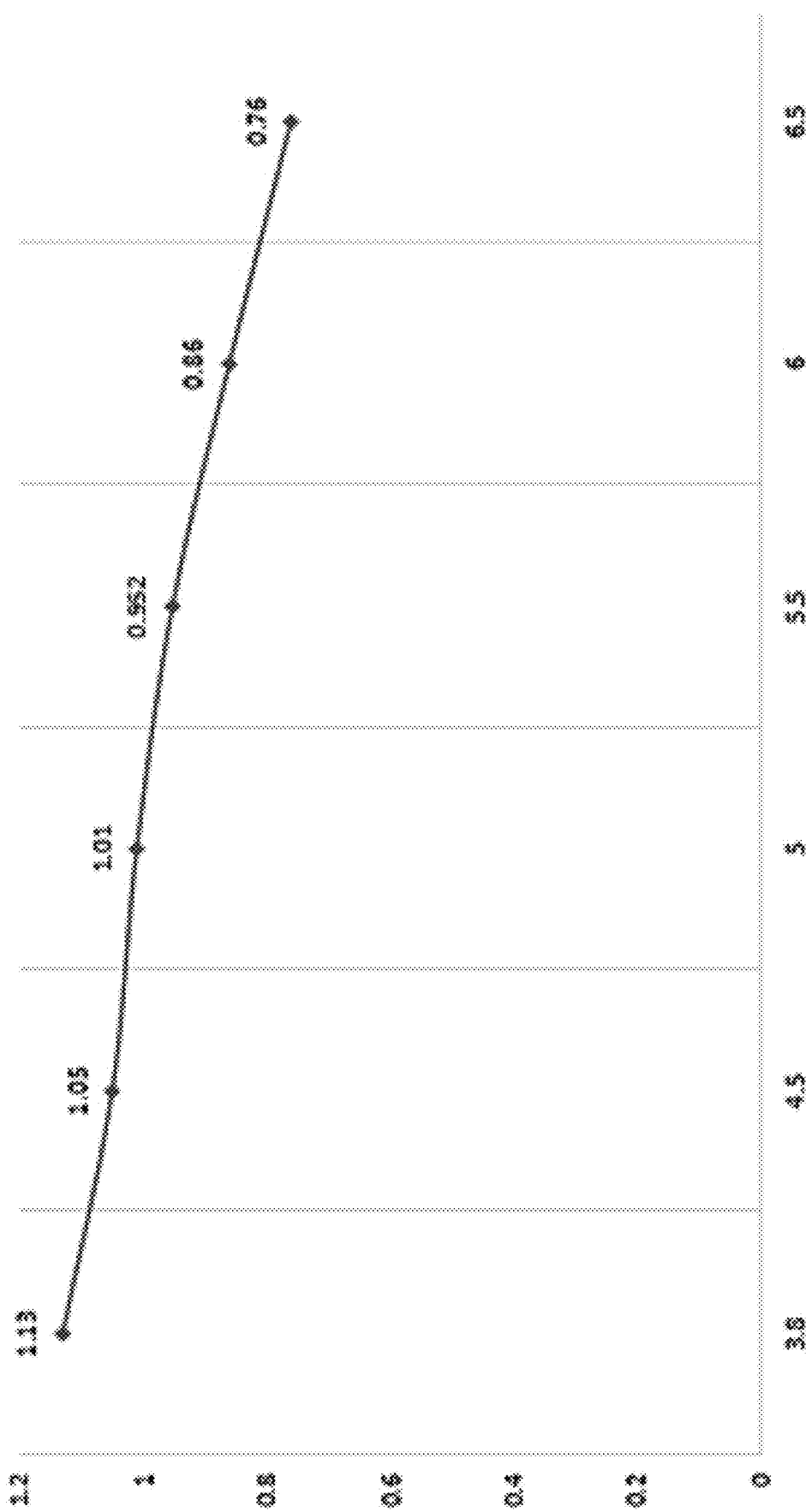
FIG. 3 is a graph depicting the compression ratio on the X-axis versus the productivity on the Y-axis for a molded biomass product produced in accordance with the method of the present invention. The biomass source here consists of *Pennisetum sinese* Roxb.

FIG. 3 is a graph depicting the compression ratio on the X-axis versus the productivity on the Y-axis for a molded biomass product produced in accordance with the method of the present invention. The biomass source here consists of *Pennisetum sinese* Roxb.

Figure 4:
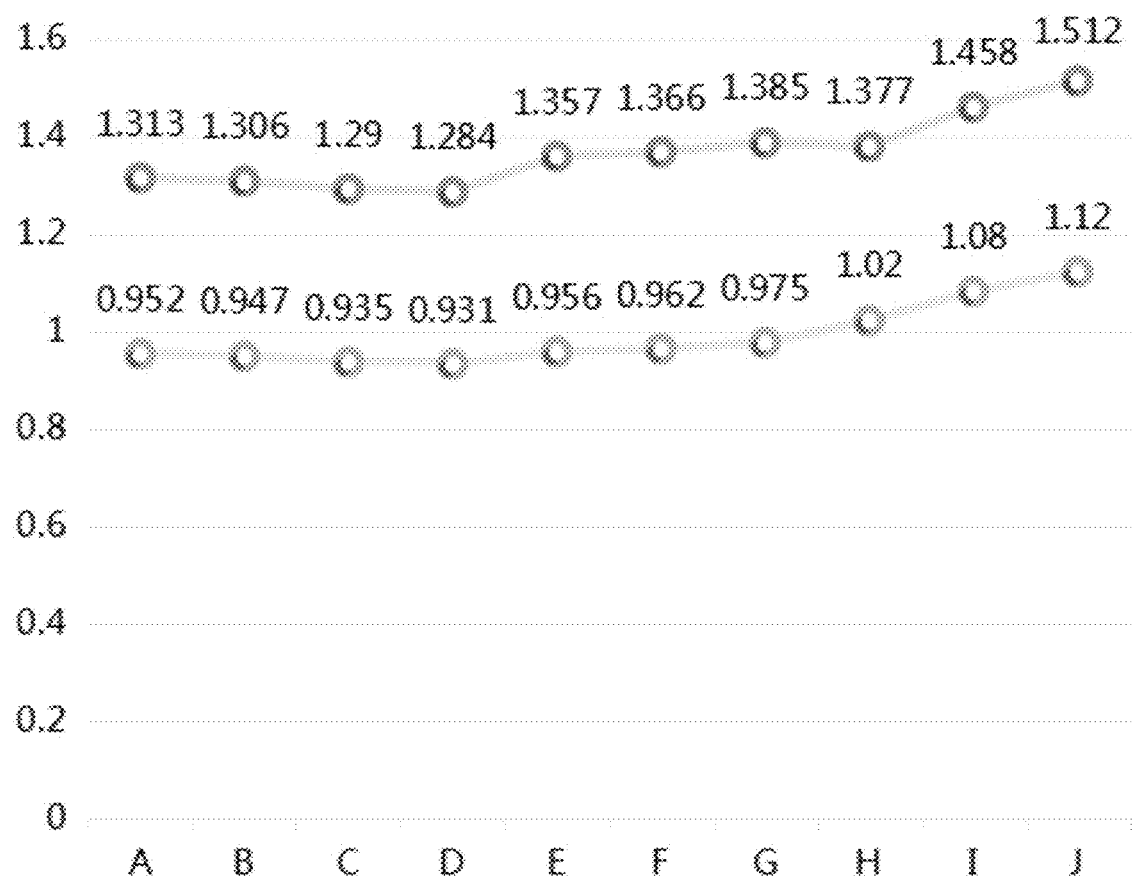
FIG. 4 shows the difference in yields after the molding step when an additive is included during the molding step against when an additive is not included, where the one or more sources of biomass consists of *Pennisetum sinese* Roxb. It can be seen that higher yields are obtained when an additive is added to the dried compressed biomass before molding.

FIG. 4 shows the difference in yields after the molding step when an additive is included during the molding step against when an additive is not included, where the one or more sources of biomass consists of *Pennisetum sinese* Roxb. It can be seen that higher yields are obtained when an additive is added to the dried compressed biomass before molding.

Figure 5:
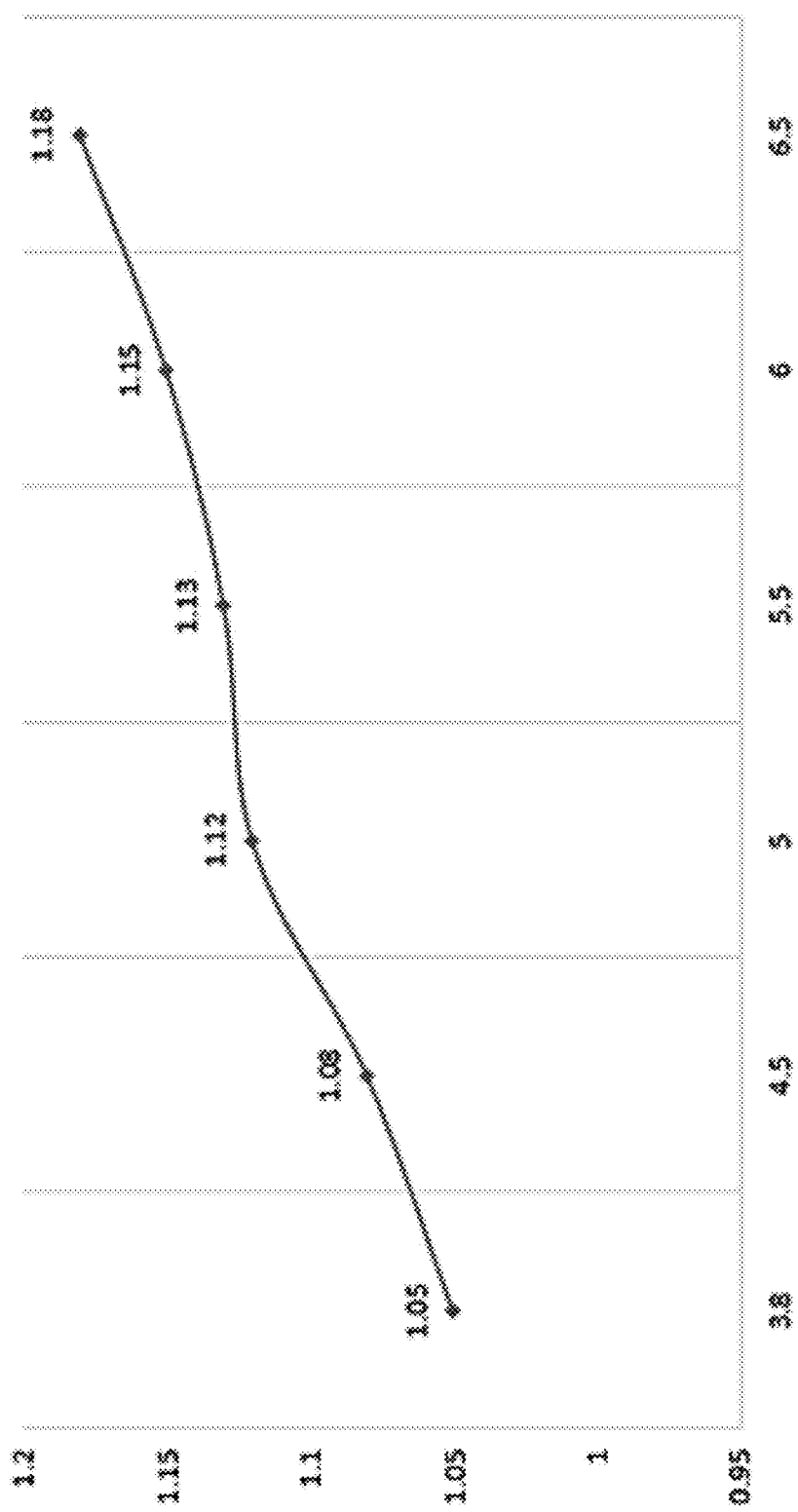
FIG. 5 is a graph depicting the compression ratio on the x-axis versus the density on the y-axis (kg/L) for a molded biomass product produced in accordance with the method of the present invention, wherein the biomass source consists of *Pennisetum sinese* Roxb.

FIG. 5 is a graph depicting the compression ratio on the x-axis versus the density on the y-axis (kg/L) for a molded biomass product produced in accordance with the method of the present invention, wherein the biomass source consists of *Pennisetum sinese* Roxb.

Typically, other than additives such as those discussed above, no other fuel source is added to the dried compressed biomass powder during the molding step. Accordingly, the molded biomass product of the molding step comprises only material derived from biomass as the fuel source in the solid biomass fuel. For example, when the dried compressed biomass powder is molded into pellets, typically, no other fuel source is added to the dried compressed biomass products prior to molding such that the solid biomass fuel pellets produced at the end of the process only contain a fuel source derived from biomass. In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass.

Where the term total fuel content of the solid fuel is used herein, this is intended to refer to the component of the solid fuel that is combustible material such as biomass derived material and coal. The term fuel content in relation to solid fuel is not intended to encompass additives that may be present in the solid fuel pellets that do not themselves combust to produce energy.

The molding step has also been found to enhance the waterproof properties of the final biomass solid fuel product. The increase in density that occurs during the molding step means that it is harder for water to penetrate the denser molded biomass product particles.

Furthermore, with a denser product, more biomass is concentrated in the interior of the molded product, and so is not in direct contact with water.

Heating the Molded Biomass Product

The molded biomass product is heated so as to produce a solid biomass fuel. The heating is carried out at a temperature of from 160° C. to 420° C. for a time period of from 0.25 to 5 hours. Preferably, the step of heating the molded biomass product is carried out for a time period of from 0.4 to 2 hours. Preferably, the step of heating the molded biomass product comprises heating the molded biomass product to a temperature of from 180° C. to 350° C., and more preferably to a temperature of from 210° C. to 280° C.

Preferably, the step (vi) of heating the molded biomass product comprises heating the molded biomass product under conditions so as to induce torrefaction of the molded biomass product. Torrefaction is a process of mild pyrolysis in which the heating is carried out in a low oxygen atmosphere such as an atmosphere of less than 10% oxygen content. Suitable conditions and processes of torrefaction are known in the art. Accordingly, preferably step (ii) of heating the molded biomass product comprises torrefaction.

The heating step may be carried out in any suitable apparatus known in the art for heating the molded biomass product. For example, the heating step may be carried out in apparatus and using process conditions as disclosed in EP3287509A1.

Preferably, step (vi) of heating the molded biomass product is adapted so as to control the uniformity of the solid biomass fuel, optionally wherein adapting step (vi) so as to control the uniformity of the solid biomass fuel comprises conducting step (vi) in an apparatus in which the molded biomass product is rotated whilst being heated, optionally, wherein adapting step (vi) so as to control the uniformity of the solid biomass fuel comprises controlling the speed or direction of rotation of the molded biomass product, optionally wherein the molded biomass product is rotated in the apparatus in both an anticlockwise and clockwise direction. The uniformity of the solid biomass fuel is also optimised by the heating temperatures and time periods discussed above.

Where the process of the invention comprises a cooling step after the step of heating the biomass, the cooling step may comprise rotating the solid biomass fuel. The biomass may be rotated in a suitable apparatus such as those disclosed in EP3287509A1. Preferably, both heating step (vi) and the step of cooling the biomass comprise rotating the biomass. Where the biomass is rotated in either the cooling step or the heating step, the biomass may be rotated in different directions, such as both clockwise and anti-clockwise in successive cycles.

The term 'uniformity' of the solid biomass product is used to refer to the solid biomass fuel or molded biomass product having constant or similar properties across each particle of solid biomass fuel or molded biomass product and across the plurality of particles within a bulk sample of the solid biomass fuel product or molded biomass product. For example, but not limited to, the densities of the particles, the ease of combustion of the particles, the chemical composition of the particles, and the water resistant properties of the particles. Uniformity is a highly desirable property for biomass fuels for use in combustion processes.

It has also been found by the inventors that controlling the heating step in the manner discussed above additionally aids in providing a solid biomass fuel product with enhanced water proof properties compared to the biomass fuels of the prior art. During the heating step, hydrophilic compounds present in the biomass powders that absorb water are degraded. Furthermore, the heating step causes oils present in the biomass powders to migrate to the exterior of the biomass powder particles, increasing the hydrophobicity of said particles.

Removing Dust Particles from the Solid Biomass Fuel

The process of the invention involves a step of removing dust particles from the solid biomass fuel. It has been found by the inventors of the present invention that in biomass solid fuel production processes known in the art, significant quantities of dust adheres to the solid biomass fuel. This dust is problematic because it may pollute the air during transport and packaging of the solid biomass fuel. The dust may also pollute the local environment. Furthermore, when stored in the open air, dust particles form mildew and affect the performance and quality of the solid biomass fuel. Thus, it would be beneficial for dust on the surfaces of the particles of the solid biomass fuel to be removed.

The inventors have found that the dust on the surface of the biomass solid fuel particles may be removed by inducing friction between the particles. For example, dust that is adhered to the particles may be removed by inducing friction by means such as vibrating or rotating the solid biomass fuel particles. Accordingly, the step (vii) of removing dust from the solid biomass particles preferably comprises inducing friction between the particles of solid biomass fuel. Preferably, step (vi) of removing dust from the solid biomass particles comprises subjecting the particles to vibration, rotation, rolling, or any combination thereof.

Figure 7:
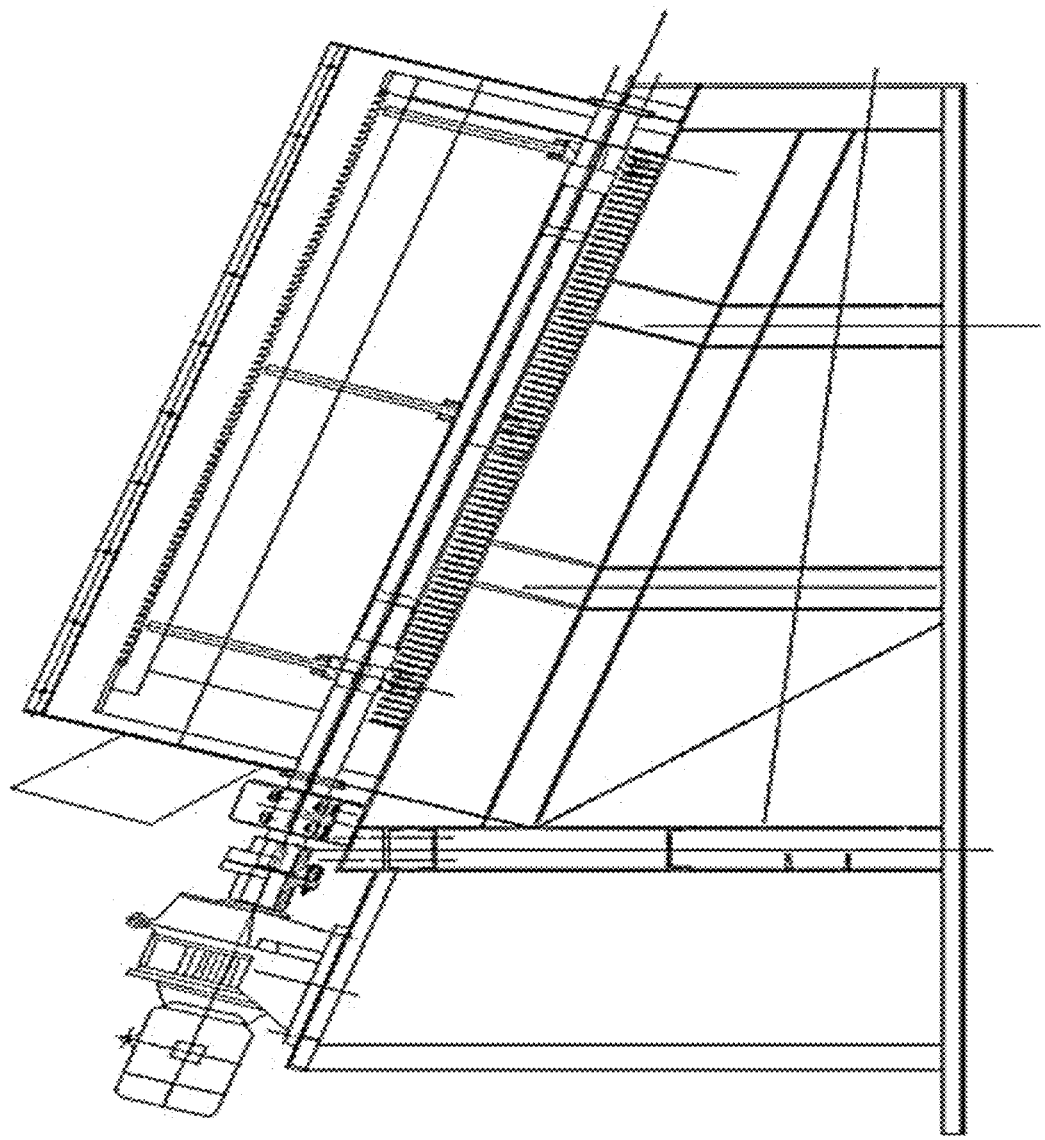
FIGS. 7 and 8 show apparatus that may be used in vibrating, rolling or rotating a biomass solid fuel product of the invention.
Figure 8:
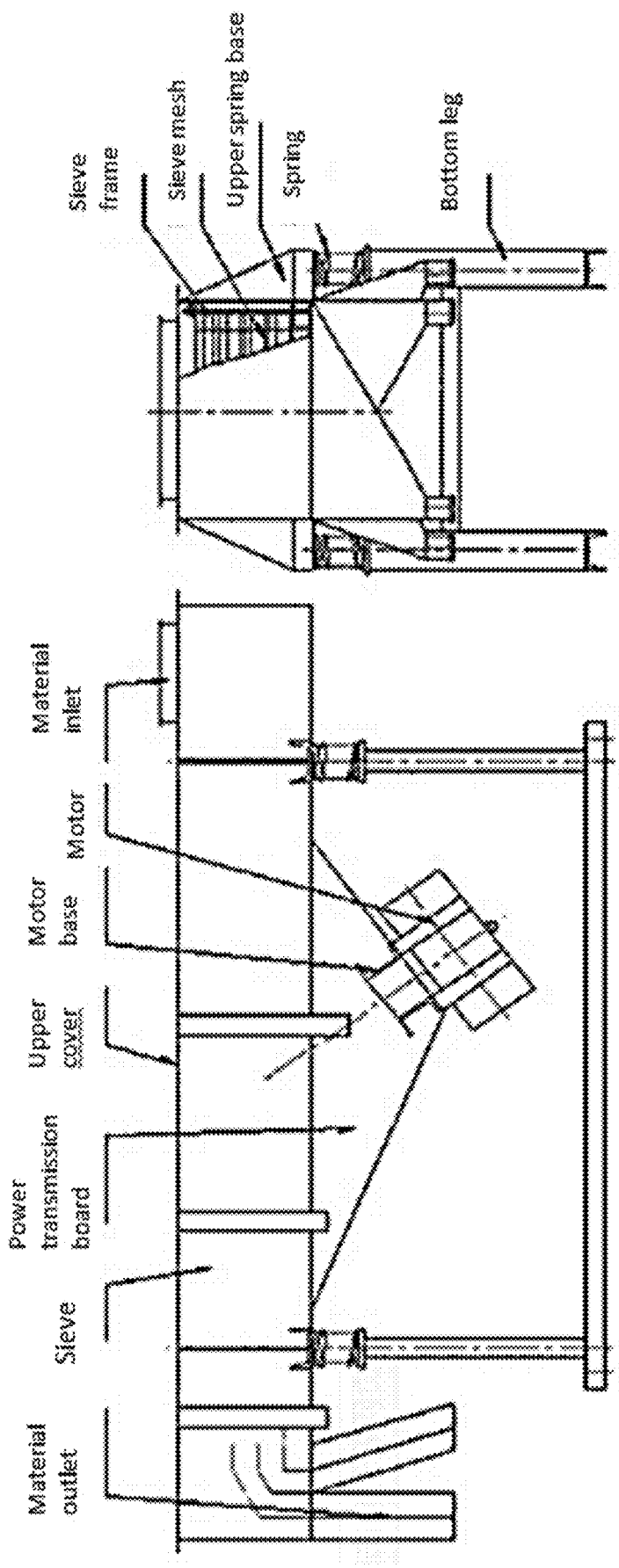

Suitable apparatus for conducting rolling, rotation, and vibration of the solid biomass fuel particles are known to the person skilled in the art, and are shown in FIGS. 7 and 8. Step (vii) of removing dust particles from the solid biomass fuel may comprise removing dust particles from the solid biomass fuel with a screen. Preferably, the screen has a pore size of from 2 mm to 10 mm, more preferably 3 mm to 8 mm, and most preferably from 4 mm to 6 mm. Dust particles that are admixed with the solid biomass fuel particles may be separated from the solid biomass fuel by passing through the screen. The larger solid biomass fuel particles do not pass through the screen and are thus separated from the dust particles. Suitable apparatus and methods for performing the screening step are known to those skilled in the art, and any of said suitable apparatus may be used. For example, an apparatus that employs screening, rolling and rotating the solid biomass fuel may be used to remove dust particles from the solid biomass fuel. In the use of such a device, solid biomass fuel may be laid upon a screen, and the screen may be driven to roll and rotate upon its axis by operation of a motor. During rolling/tilting and rotation of the screen, material on the sieve surface of the screen is turned over. Some material passes through the screen and is separated from material that does not pass through the screen. The rolling and rotation of the screen causes material stuck in the pores of the screen to fall through and thus clogging of the pores of the screen is prevented. Alternatively, an apparatus that vibrates and screens the solid biomass fuel particles may be used. In this case, a motor can be used to vibrate the screen which may cause material to be thrown up on the screen surface. This process may cause small particles adhered to larger ones to come loose and then pass through the pores in the screen. An example of an apparatus that employs a screen and vibration to separate larger particles from smaller particles, where the smaller particles may or may not be adhered to the larger particles is a device as taught in CN201324717.

Accordingly, preferred methods of the invention comprise subjecting the solid biomass fuel particles to one or more of rolling, rotation and vibration so as to induce friction between the solid biomass fuel particles which causes dust particles adhered to said solid biomass fuel particles to be removed from said particles. The methods then preferably comprise subjecting the mixture of solid biomass fuel particles and dust particles to a screening step as discussed above to remove said dust particles from said solid biomass fuel particles. Accordingly, removal step (vii) is an effective post-treatment for removing dust from said particles of solid biomass fuel.

Pre-Treatment and Post-Treatment

Steps (v) and (vi) discussed above of molding and heating so as to form a solid biomass fuel can typically be considered to be the principal production steps of converting the one or more sources of biomass into a solid biomass fuel.

In contrast, steps (i) to (iv) of providing, pulverising, compressing and drying the biomass can be considered to be a method of pre-treating one or more sources of biomass prior to the conversion of said one or more sources of biomass (in a processed form as the dried compressed biomass powder) into the solid biomass fuel via molding and heating steps. Accordingly, the invention provides a pre-treatment process as discussed above. The pre-treatment process comprises steps (i) to (iv) of providing, pulverising, compressing and drying the biomass. These steps can be the same as steps (i) to (iv) discussed above in the context of the process according to the invention of producing a solid biomass fuel.

The pre-treatment process of the invention is preferably carried out before steps (v) to (vii) discussed above of the process of making a solid biomass fuel. However, this is not essential, and the pre-treatment process of the invention may be carried out prior to any process for converting one or more sources of biomass into a solid biomass fuel. Preferably, the pre-treatment process is carried out before a process for producing a solid biomass fuel that comprises a step of molding, heating, or both molding and heating.

The term "pre-treatment" as used herein refers to a process carried out to condition a starting material in a process for converting one or more sources of biomass into a solid biomass fuel. Preferably, the term "pre-treatment" refers to treating a biomass source starting material prior to a process of converting said biomass source into a solid biomass fuel, where said process involves a molding or heating step.

Step (vii) discussed above of removing dust particles form the solid biomass fuel may be considered to be a post-treatment step of the solid biomass fuel. Accordingly, the invention provides a post-treatment process as discussed above.

The post-treatment process of the invention is preferably carried out after steps (v) to (vi), or steps (i) to (vi) discussed above of the process of making a solid biomass fuel. However, this is not essential, and the post-treatment process of the invention may be carried out after any process for converting one or more sources of biomass into a solid biomass fuel. Preferably, the post-treatment process is carried out after a process for producing a solid biomass fuel that comprises a step of molding, heating, or both molding and heating.

The term "post-treatment" as used herein refers to a process carried out on a solid biomass fuel after said solid biomass fuel has been produced from one or more sources of biomass. Preferably, the term "post-treatment" refers to treating a biomass source starting material after a process of converting said biomass source into a solid biomass fuel, where said process involves a molding or heating step.

The Solid Biomass Fuel Product

The solid biomass fuel product may have any of the physical properties discussed above.

As discussed above, the biomass solid fuel of the invention preferably comprises pellets. The pellets may be any suitable size. Preferably, the pellets have a diameter of from 3 mm to 100 mm, and more preferably, 5 mm to 8 mm. Preferably, the pellets have a length of from 20 mm to 60 mm, and more preferably from 30 mm to 50 mm. As discussed above, surprisingly, it has been found that the solid biomass fuel product of the invention has enhanced waterproof characteristics compared to solid biomass fuel products made by prior art processes. This is believed to be due to controlling the molding and/or heating step as discussed above. Biomass fuels of the prior art have been found by the inventors to be sufficiently water proof for only up to 10 days. In contrast, it has been found the solid biomass fuel products of the invention are sufficiently water proof up to 20 days, preferably 30 days and more preferably 40 days.

The water proof properties of the solid biomass fuels are determined according to standard tests of the Energy Research Centre of the Netherlands (ECN), described in further detail below.

The moisture content of the biomass solid fuel of the invention may also be determined by standard ECN test methods. The moisture content of the solid biomass fuel of the invention is typically from 3 to 8 wt %, preferably 4 to 7 wt %, and more preferably 4 to 6 wt %.

The solid biomass fuel of the invention has also been found to have unexpectedly high mechanical durability. The mechanical durability is typically higher than 95%. This is advantageous since biomass pellets of 95% mechanical durability or greater have been found to be able to stored outside without damage to for periods as long as two months. In contrast, biomass pellets with less than 95% mechanical durability typically are damaged by rainfall and are not able to be stored outside. Accordingly, high mechanical durability is an additional advantage of biomass pellets of the invention.

An additional advantage associated with high durability of the solid biomass fuel particles is that if the pellets are somehow broken by force, they fall apart in larger pieces than pellets with low mechanical durability. This minimises any dust explosion risks.

As discussed above, in preferable embodiments, typically, other than additives such as those discussed above, no other fuel source is added to the heated biomass product during the molding step. Accordingly, the solid biomass fuel typically comprises only material derived from biomass as the fuel source in the solid biomass fuel. For example, when the heated biomass product is molded into pellets, typically, no other fuel source is added to the heated biomass products prior to molding such that the solid biomass fuel pellets produced by the molding step only contain a fuel source derived from biomass.

In preferable embodiments, the solid biomass fuel thus comprises at least 50% by weight of the total fuel content of the fuel, such as at least 60% by weight, at least 70% by weight, at least 80% by weight, at least 90% by weight and preferably at least 95% by weight of material derived from biomass. Where the one or more sources of biomass consist or consist essentially of rice husk, the biomass solid fuel comprises at least 95% by weight of the total fuel content of the fuel of material derived from biomass.

Combustion Processes

The product of the present invention may be used in a variety of different combustion processes. The suitability of said products for use in a particular process will be apparent to those of skill in the art. For example, the biomass fuel of the invention may be used in a combustion process in a power plant or industrial process on its own. Alternatively, the biomass product of the invention may be used in a combustion process along with an additional fuel such as coal in a co-firing process.

Advantageously, products of the invention have been found to provide very low PM1.0 emissions when compared to other biomass fuels known in the art. Additionally, the PM1.0 emissions of the process are lower than processes that involve the combustion of coal.

Advantageously, the improved physical properties of biomass fuels of the invention have been found to render the biomass particularly suitable for co-firing with coal. For example, the improved quality and uniformity of the product enable the biomass fuel of the invention to be co-fired with coal particularly well. The improved water proof properties of the biomass fuel of the invention also mean that the biomass is particularly suited to being co-fired with coal as well as being made easier to store and transport due to its water proof nature.

Example 1

A process according to the present invention was carried out. The source of biomass was *Pennisetum sinese* Roxb only. The temperature of the heating step was from 220° C. to 280° C. for a time period of from 0.4 to 2 hours. After the heating step, the solid biomass fuel product was cooled.

Figure 6:
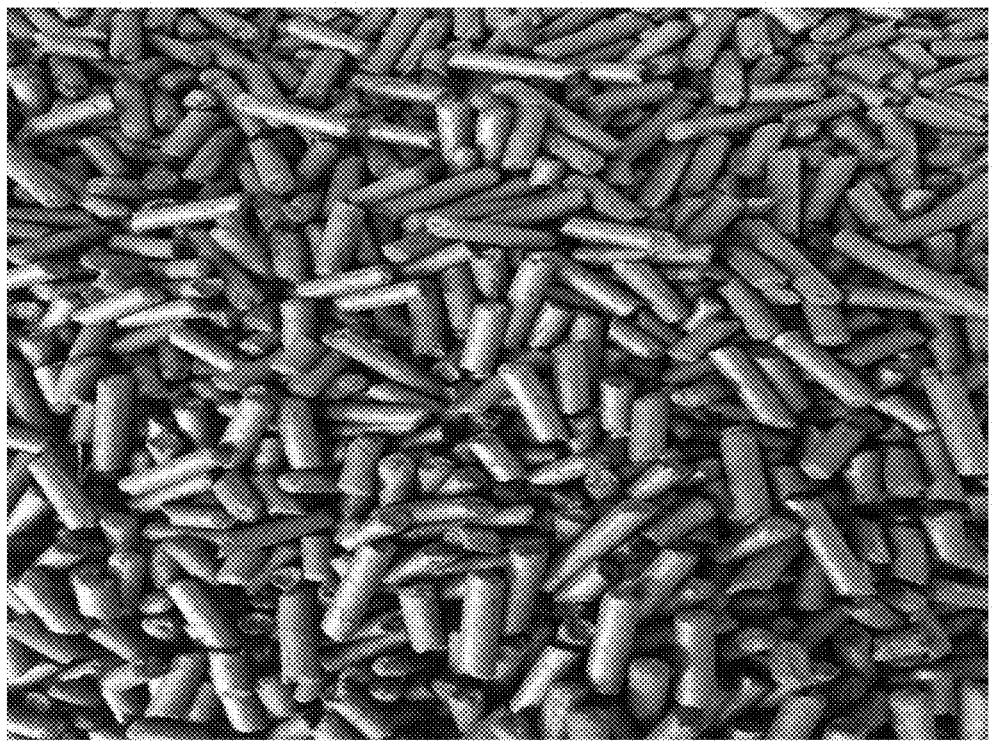
FIG. 6 shows a photograph of a solid product of the invention.

A photograph of the solid product is shown in FIG. 6.

Example 2

A process according to the present invention was carried out. The source of biomass was 75% by weight *Pennisetum sinese* Roxb and 25% by weight rice husk. The temperature of the heating step was from 220° C. to 280° C. for a time period of from 0.4 to 2 hours. After the heating step, the solid biomass fuel product was cooled.

Example 3

A process according to the present invention was carried out. The source of biomass was 50% by weight *Pennisetum sinese* Roxb and 50% by weight rice husk. The temperature of the heating step was from 220° C. to 280° C. for a time period of from 0.4 to 2 hours. After the heating step, the solid biomass fuel product was cooled.

Example 4

A process according to the present invention was carried out. The source of biomass was 25% by weight *Pennisetum sinese* Roxb and 75% by weight rice husk. The temperature of the heating step was from 220° C. to 280° C. for a time period of from 0.4 to 2 hours. After the heating step, the solid biomass fuel product was cooled.

Example 5

A process according to the present invention was carried out. The source of biomass was 75% by weight *Pennisetum sinese* Roxb and 25% by weight straw. The temperature of the heating step was from 220° C. to 280° C. for a time period of from 0.4 to 2 hours. After the heating step, the solid biomass fuel product was cooled.

Example 6

A process according to the present invention was carried out. The source of biomass was 50% by weight *Pennisetum sinese* Roxb and 50% by weight straw. The temperature of the heating step was from 220° C. to 280° C. for a time period of from 0.4 to 2 hours. After the heating step, the solid biomass fuel product was cooled.

Example 7

A process according to the present invention was carried out. The source of biomass was 25% by weight *Pennisetum sinese* Roxb and 75% by weight straw. The temperature of the heating step was from 220° C. to 280° C. for a time period of from 0.4 to 2 hours. After the heating step, the solid biomass fuel product was cooled.

Example 8

A process according to the present invention was carried out. The source of biomass was 75% by weight *Pennisetum sinese* Roxb and 25% by weight corn cob. The temperature of the heating step was from 220° C. to 280° C. for a time period of from 0.4 to 2 hours. After the heating step, the solid biomass fuel product was cooled.

Example 9

A process according to the present invention was carried out. The source of biomass was 50% by weight *Pennisetum sinese* Roxb and 50% by weight corn cob. The temperature of the heating step was from 220° C. to 280° C. for a time period of from 0.4 to 2 hours. After the heating step, the solid biomass fuel product was cooled.

Example 10

A process according to the present invention was carried out. The source of biomass was 25% by weight *Pennisetum sinese* Roxb and 75% by weight corn cob. The temperature of the heating step was from 220° C. to 280° C. for a time period of from 0.4 to 2 hours. After the heating step, the solid biomass fuel product was cooled.

Characterisation of Solid Biomass Fuels Produced in Examples 1 to 10

Figure 9:
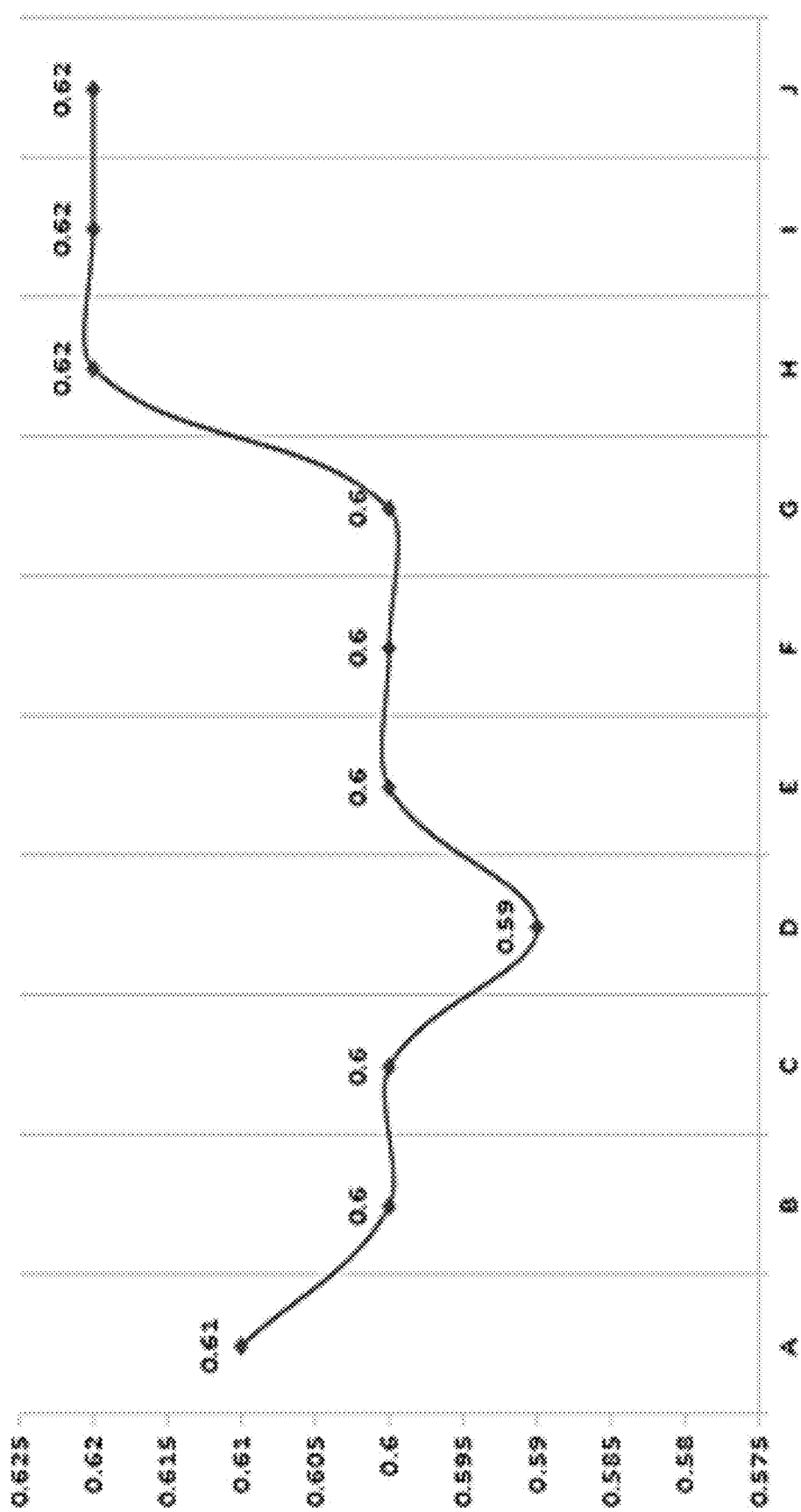
FIG. 9 is a graph depicting the bulk density of several products of the present invention.

The bulk density (kg/L) of the solid biomass fuels prepared in Examples 1 to 10 was measured using DIN EN 15103, and is shown in FIG. 9.

Figure 10:
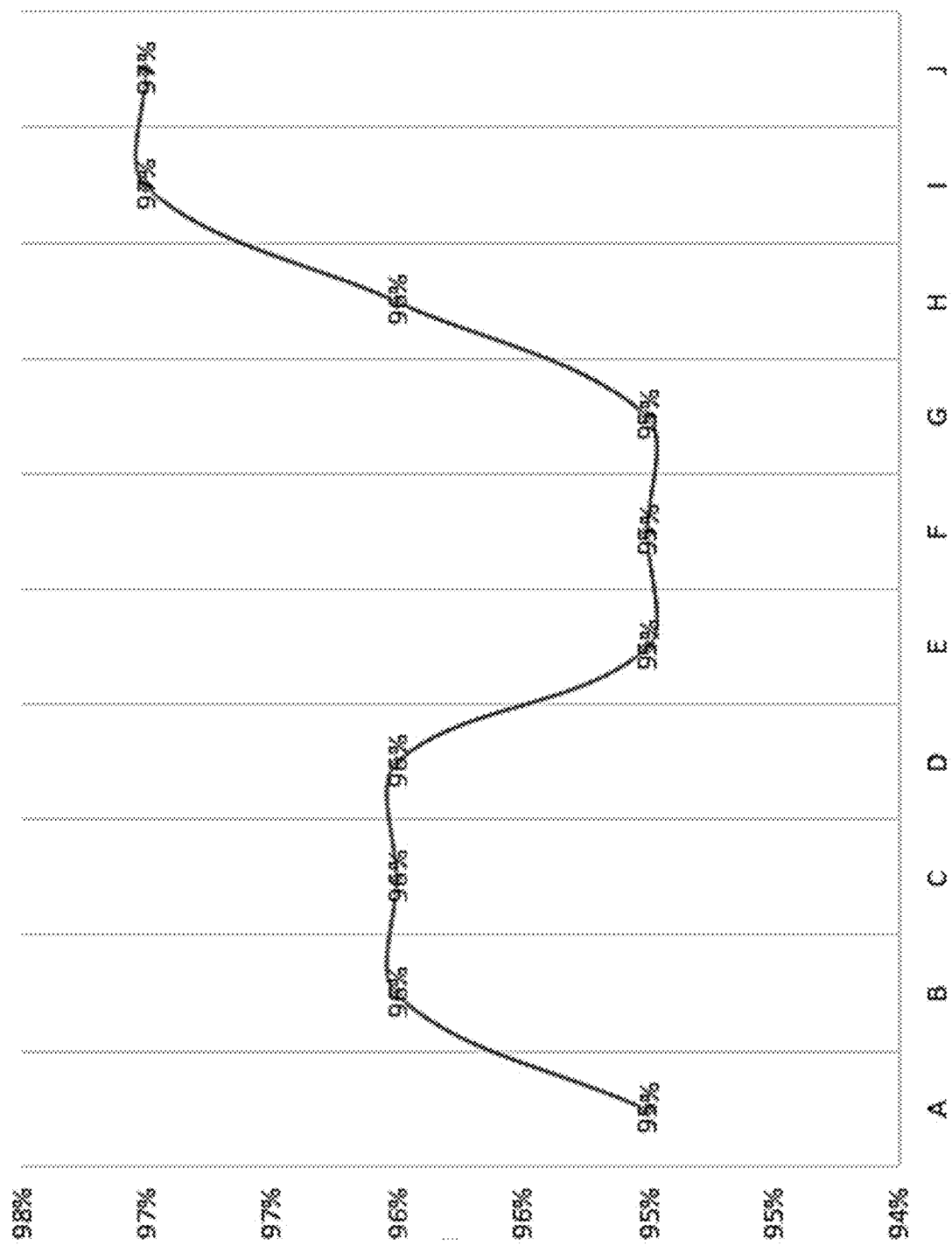
FIG. 10 is a graph depicting the durability of several products of the present invention.

The durability of the solid biomass fuels prepared in Examples 1 to 10 was determined according to DIN EN 15210-1, and is shown in FIG. 10.

Figure 11:
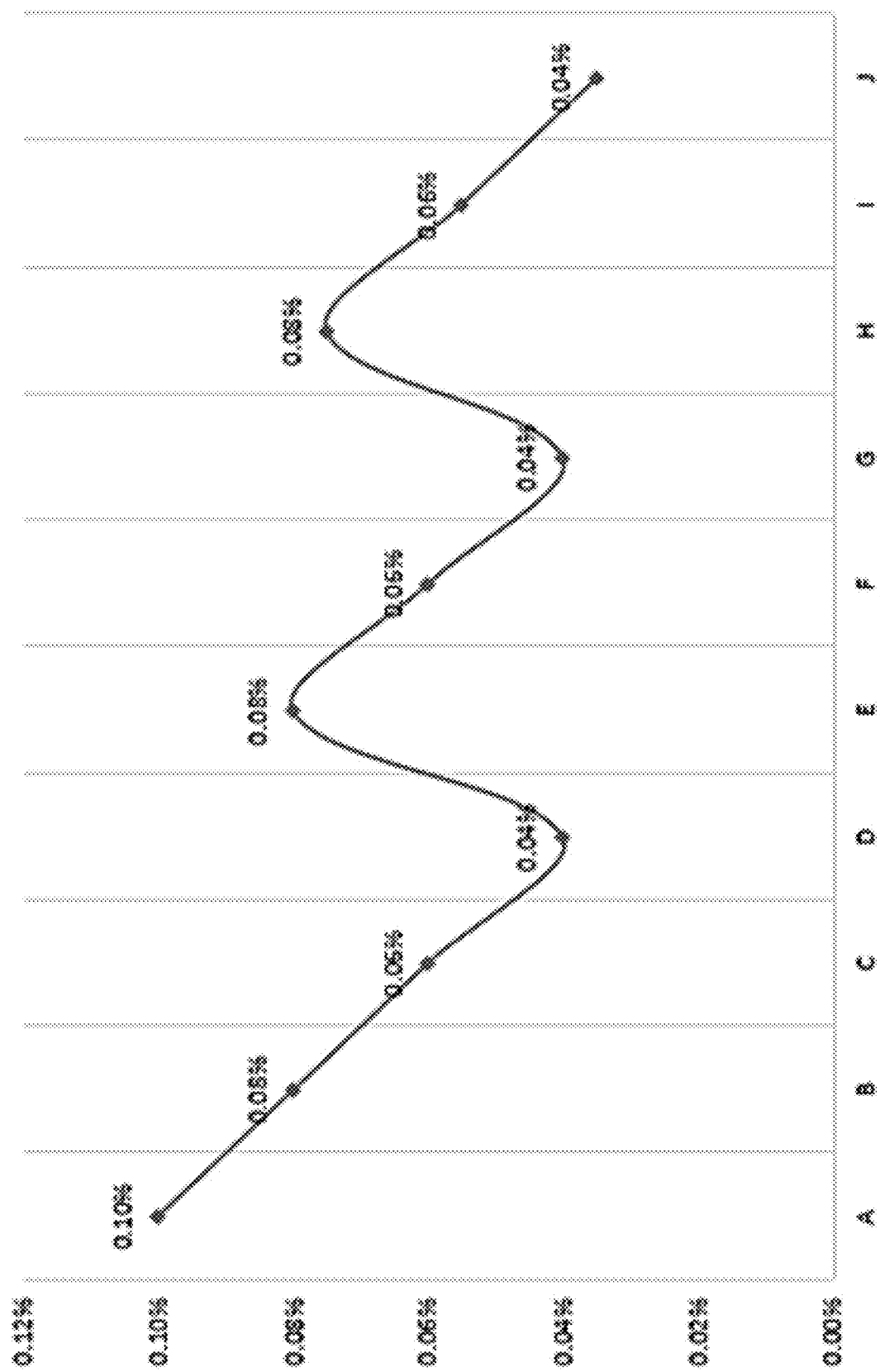
FIG. 11 is a graph depicting the sulfur content of several products of the invention.

The sulfur content of the solid biomass fuels prepared in Examples 1 to 10 is shown in FIG. 11. The sulphur content is determined in accordance with DIN EN 15289.

Figure 12:
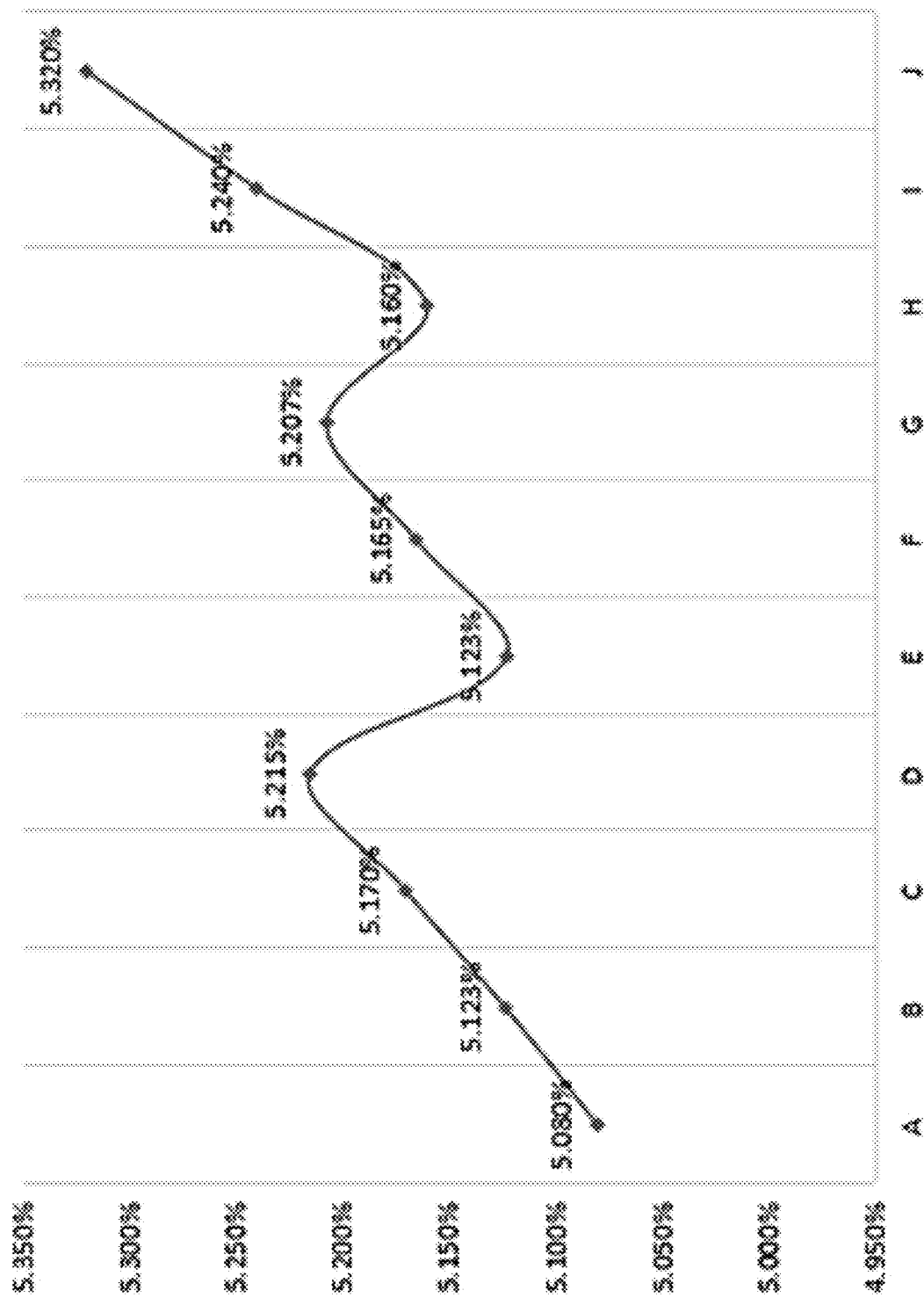
FIG. 12 is a graph depicting the hydrogen content of several products of the present invention.

The hydrogen content of the solid biomass fuels prepared in Examples 1 to 10 is shown in FIG. 12. The hydrogen content was determined according to DIN EN 15104.

Figure 13:
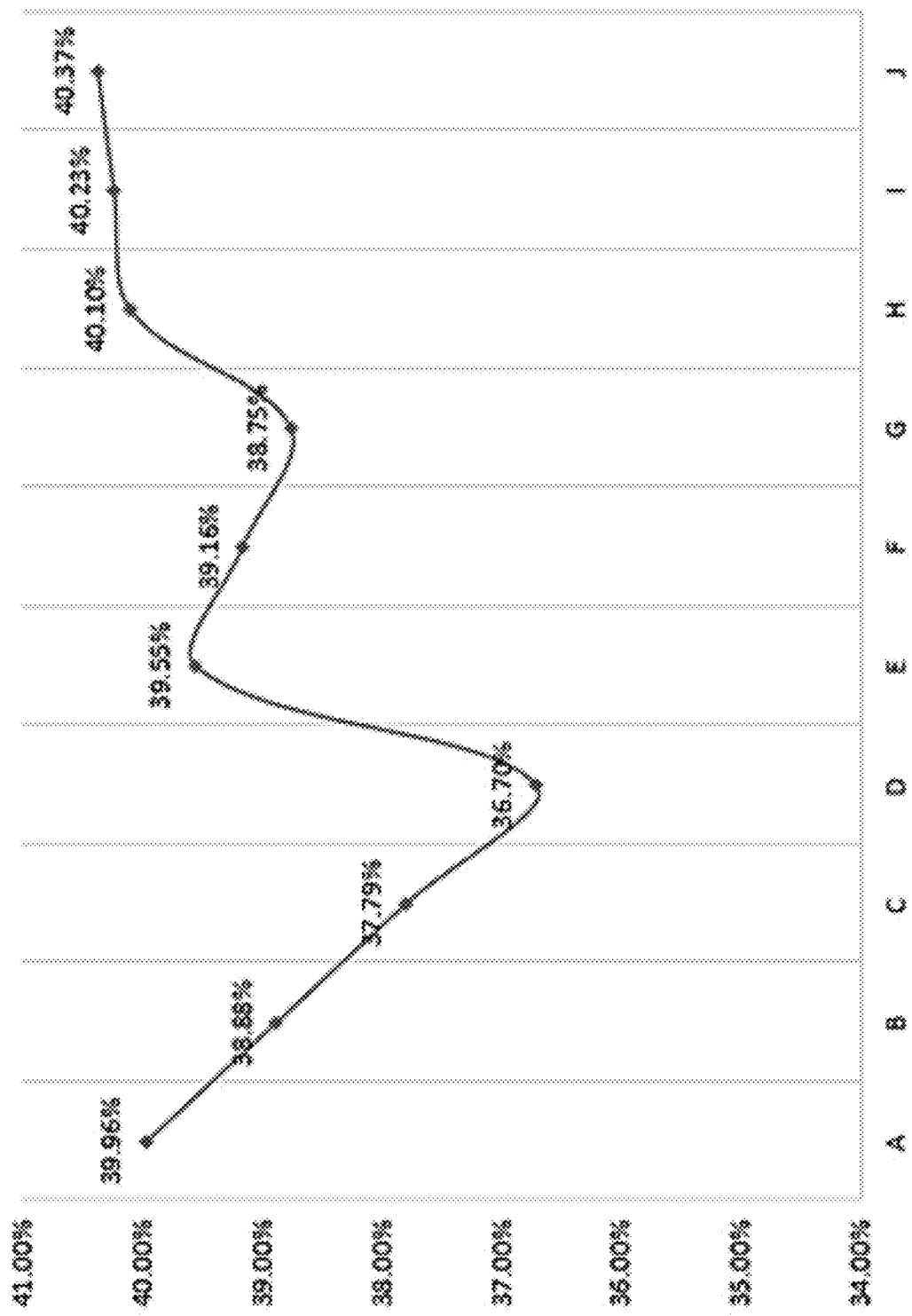
FIG. 13 is a graph depicting the oxygen content of several products of the present invention.

The oxygen content of the solid biomass fuels prepared in Examples 1 to 10 is shown in FIG. 13. The oxygen content was determined according to DIN EN 15296.

Figure 14:
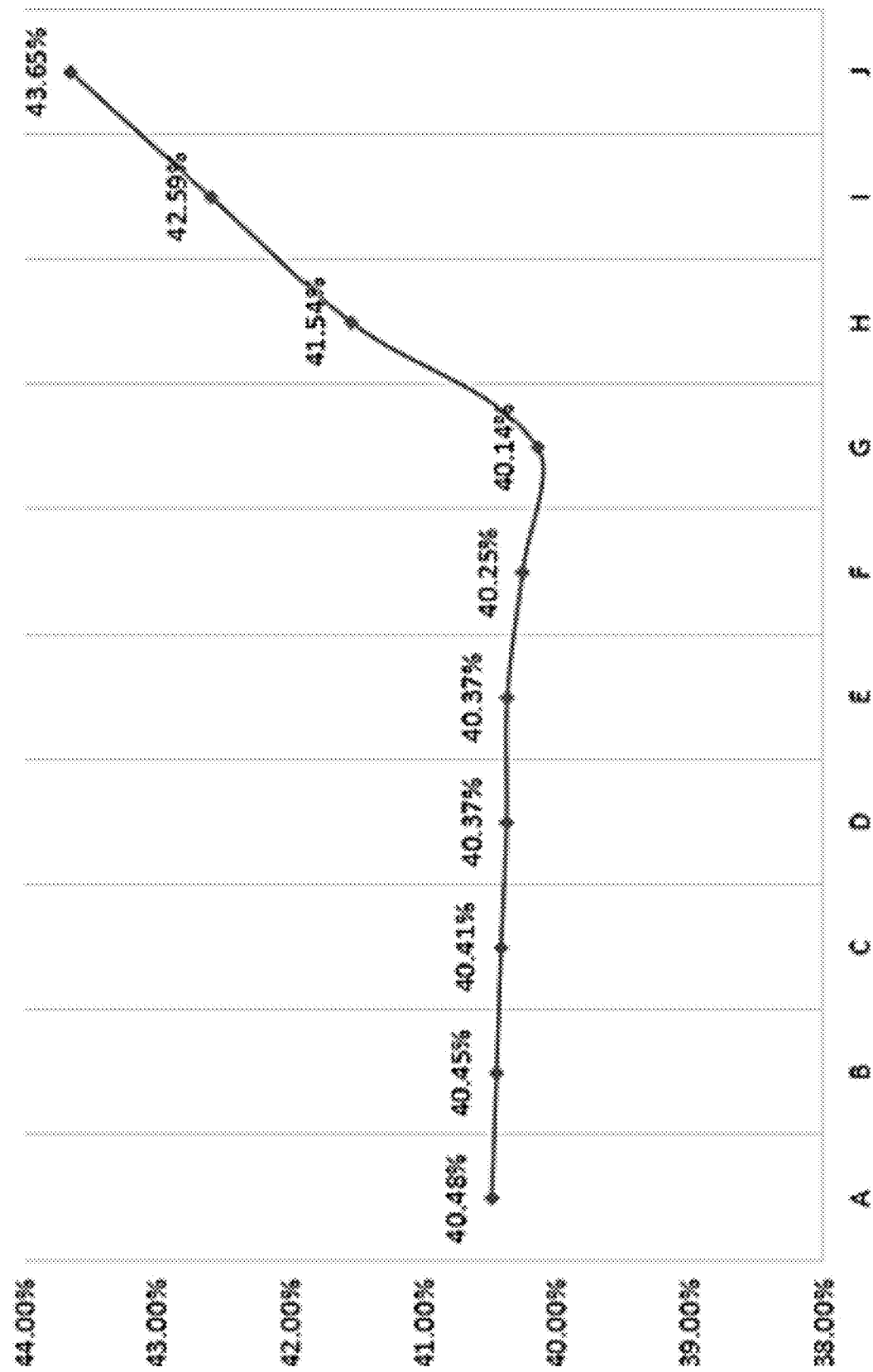
FIG. 14 is a graph depicting the carbon content of several products of the invention.

The carbon content of the biomass solid fuel prepared in Examples 1 to 10 is shown in FIG. 14. The carbon content is determined in accordance with DIN EN 15104.

Figure 15:
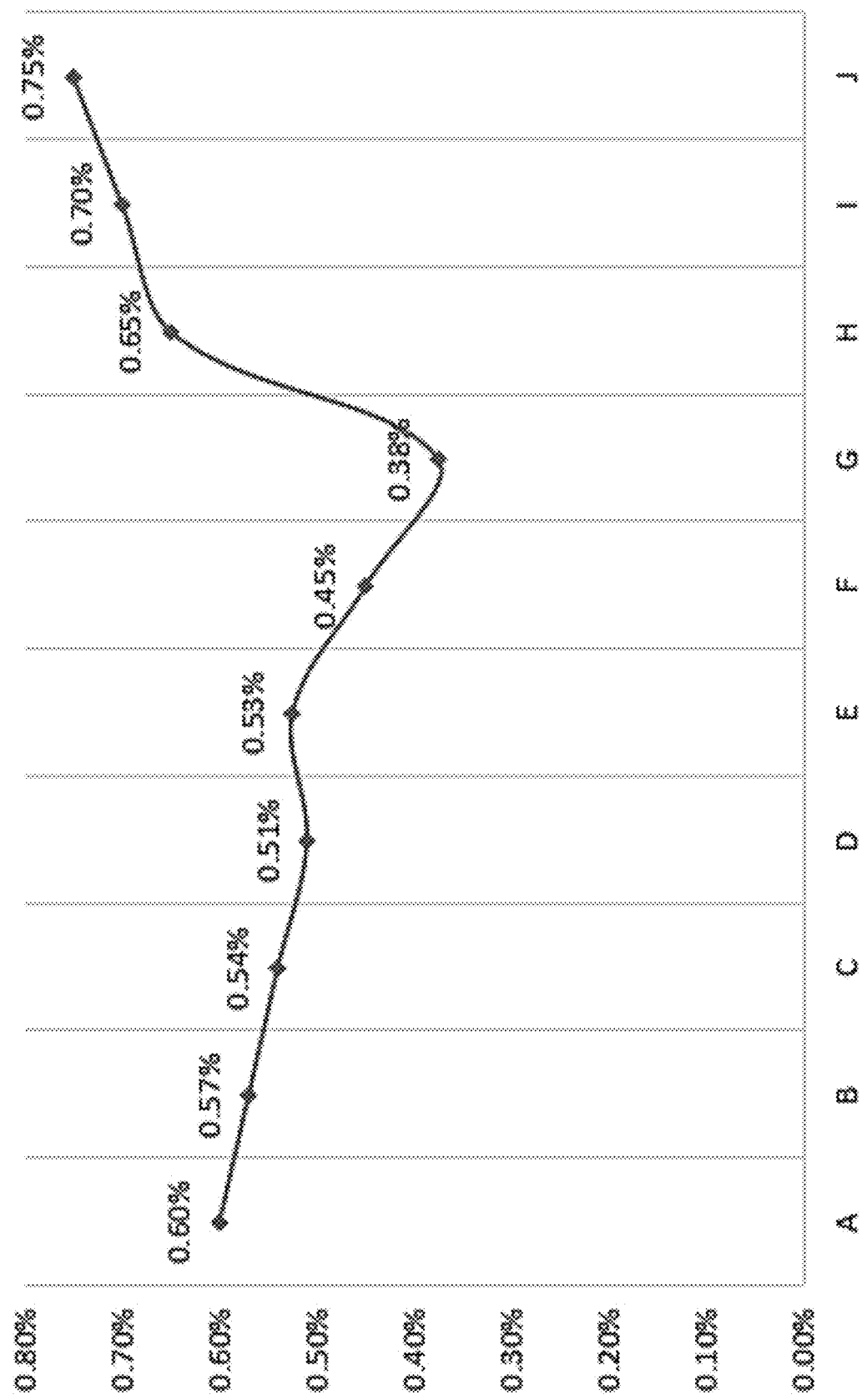
FIG. 15 is a graph depicting the nitrogen content of several products of the invention.

The nitrogen content of the biomass solid fuel prepared in Examples 1 to 10 is shown in FIG. 15. The nitrogen content is determined in accordance with DIN EN 15104.

Figure 16:
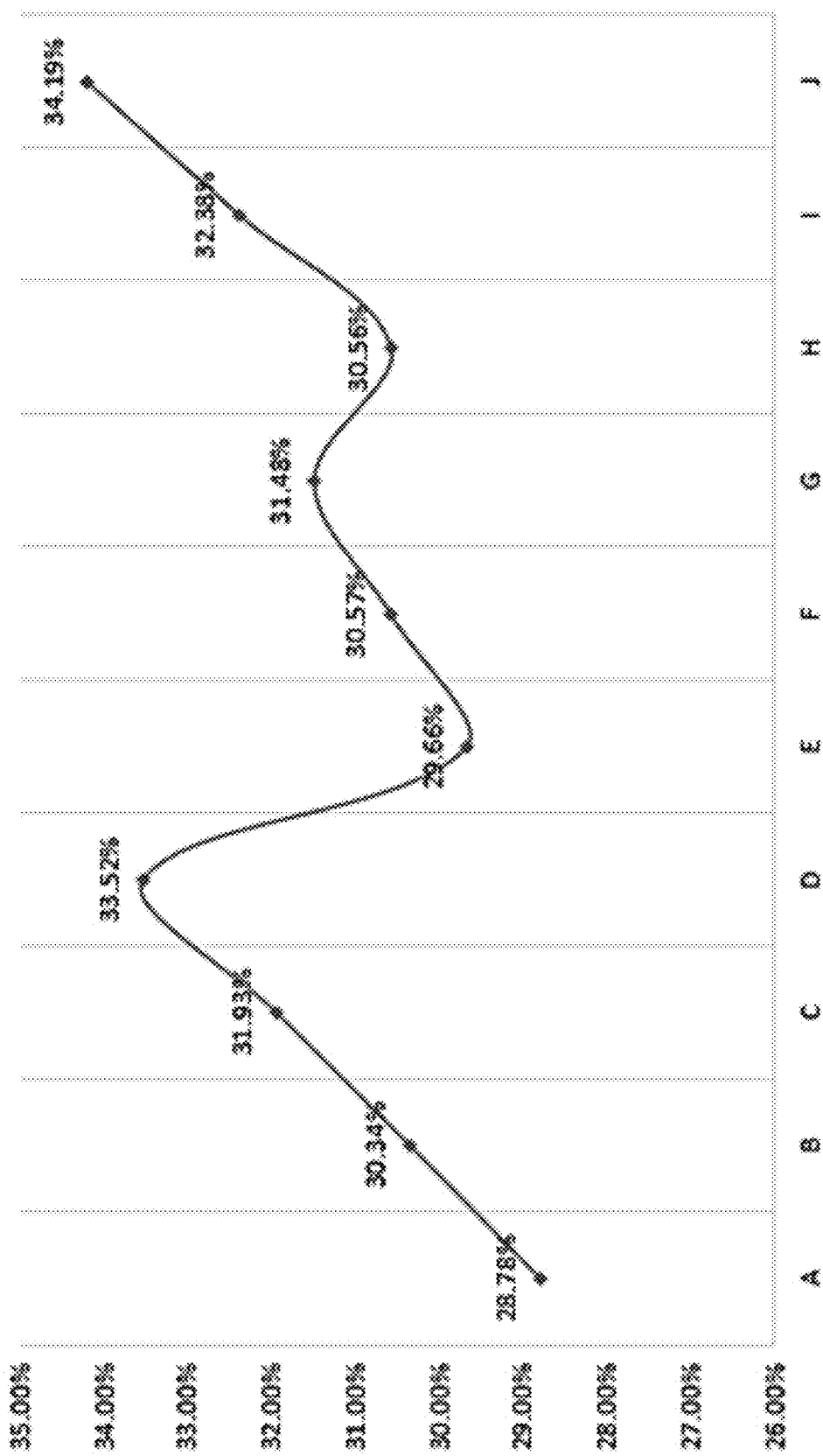
FIG. 16 is a graph depicting the fixed carbon content of several products of the invention.

The fixed carbon content of the biomass solid fuel prepared in Examples 1 to 10 is shown in FIG. 16. The fixed carbon content is determined in accordance with DIN EN 51734.

Figure 17:
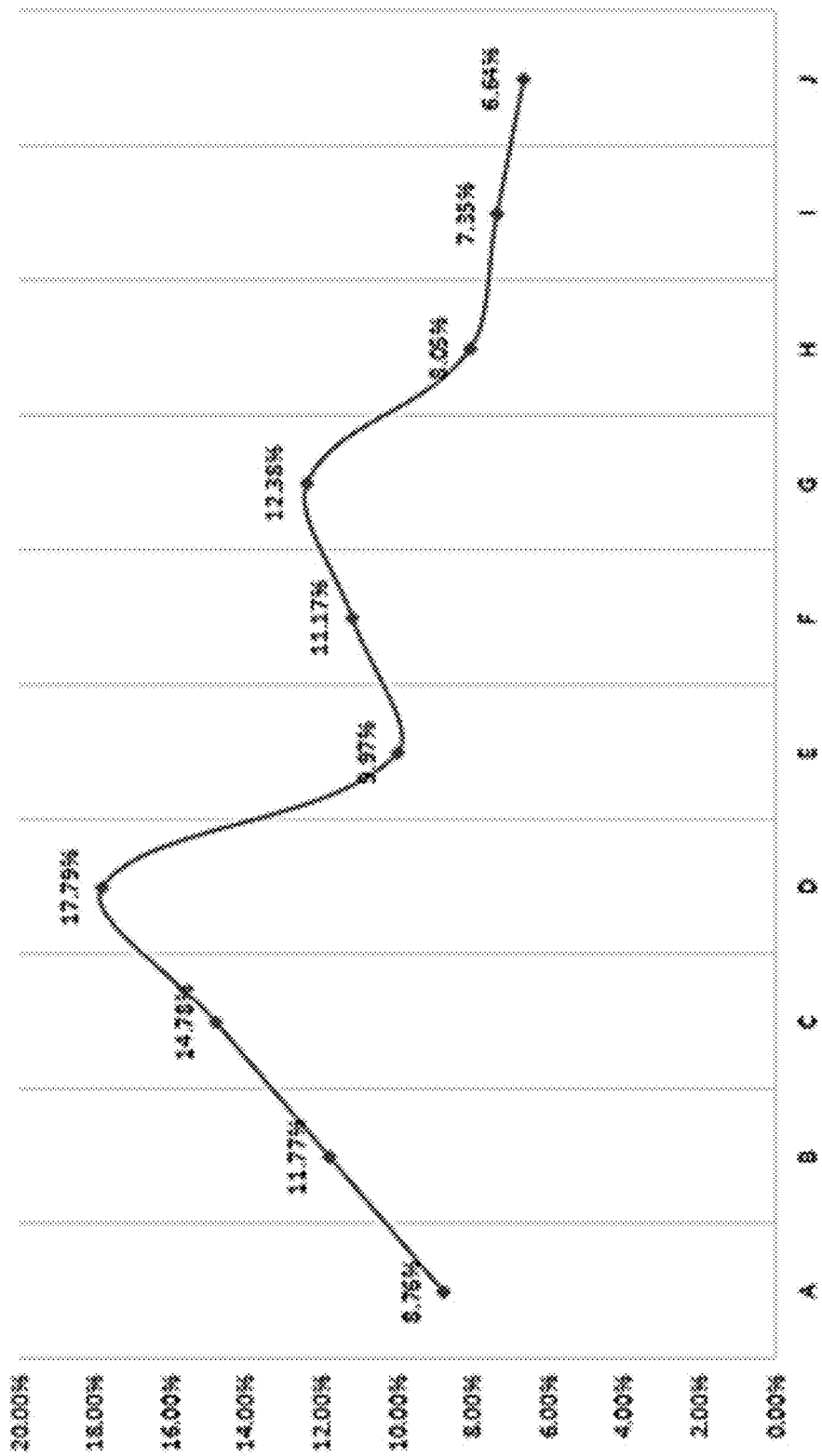
FIG. 17 is a graph depicting the ash content of several products of the present invention.

The ash content of the biomass solid fuel prepared in Examples 1 to 10 is shown in FIG. 17. The ash content was determined according to DIN EN 14775 at 550° C.

Figure 18:
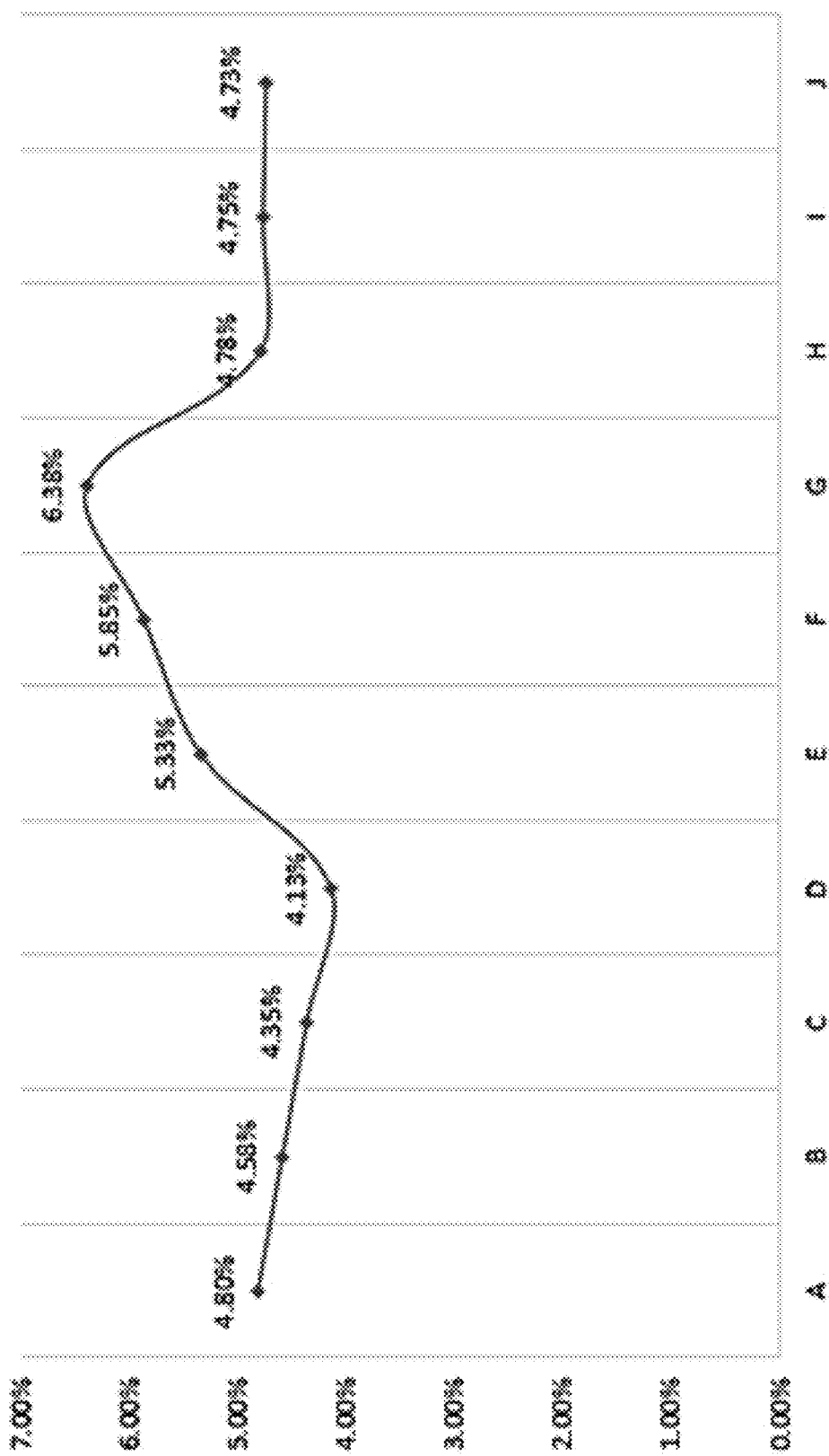
FIG. 18 is a graph depicting the moisture content of several products of the present invention.

The moisture content of the biomass solid fuel prepared in Examples 1 to 10 is shown in FIG. 18. The water content was determined in accordance with DIN EN 14774-2.

Figure 19:
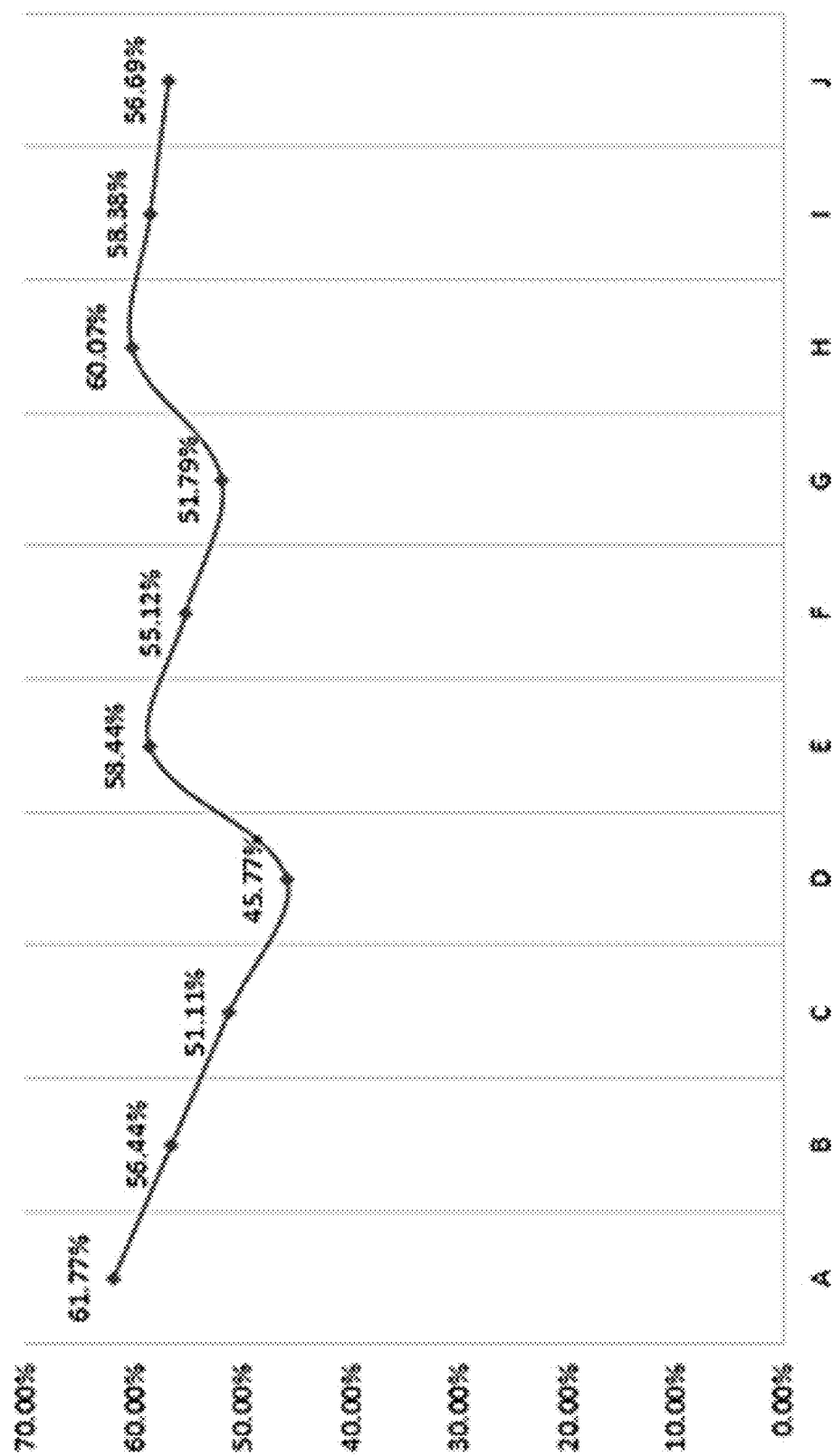
FIG. 19 is a graph depicting the volatile matter content of several products of the present invention.

The volatile matter content of the solid biomass fuels prepared in Examples 1 to 10 is shown in FIG. 19.

Figure 20:
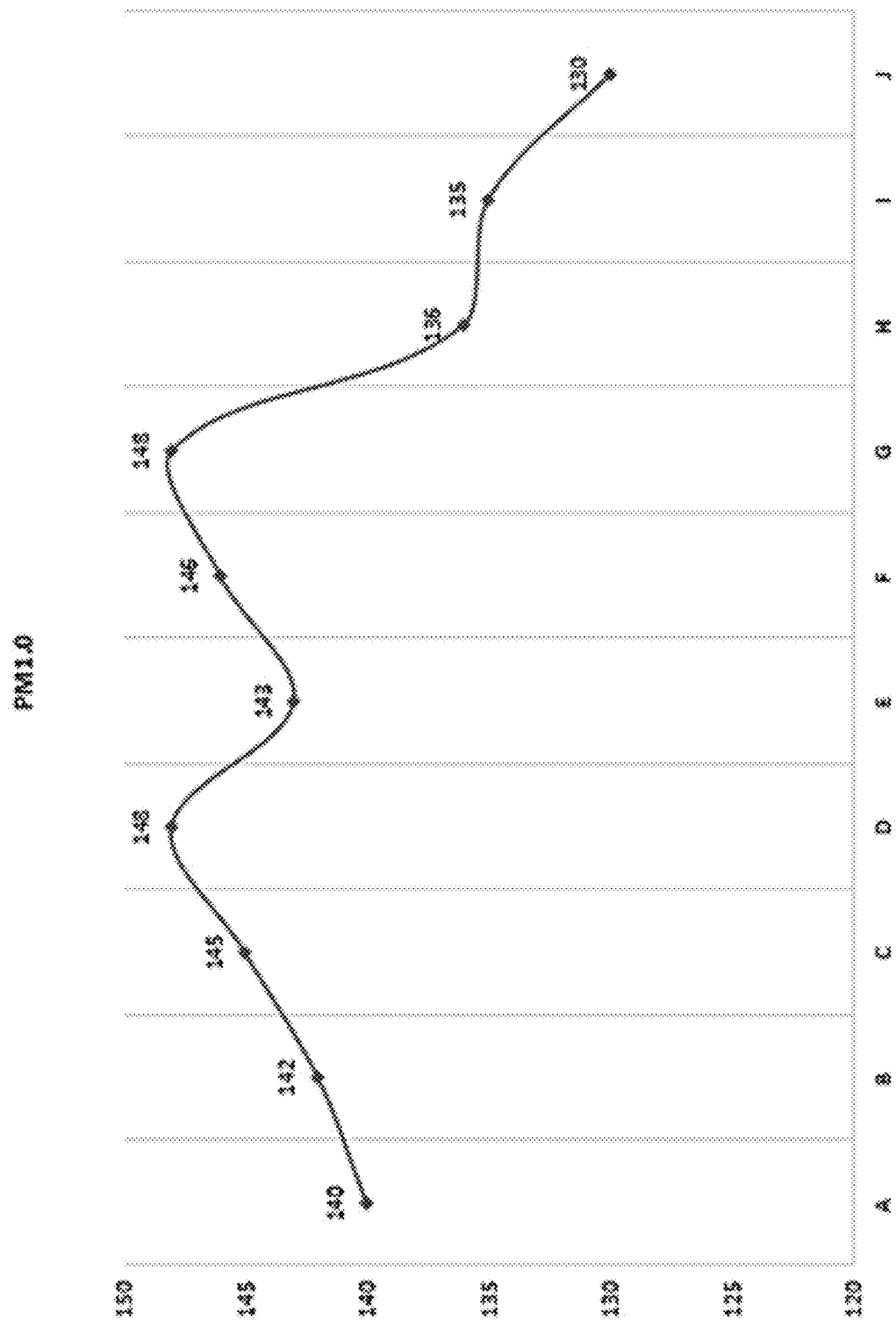
FIG. 20 is a graph depicting PM 1.0 emissions for several products of the present invention.

The PM1.0 emissions of the biomass solid fuels produced in Examples 1 to 10 are shown in FIG. 20. The PM1.0 emissions were determined according to the standard method of the German ECN testing institute.

In the above figures, the product of Example 1 is represented as A, the product of Example 2 is represented as B, the product of Example 3 is represented as C, the product of Example 4 is represented as D, the product of Example 5 is represented as E, the product of Example 6 is represented as F, the product of Example 7 is represented as G, the product of Example 8 is represented by H, the product of Example 9 is represented by I, and the product of Example 10 is represented by J.

Example 11

The solid biomass fuel of Example 1 was tested in an artificial climate experiment where it was exposed to an artificial climate chamber for 10 days. This test is an ECN standard test for assessing the moisture content of biomass fuel particles.

Figure 21:
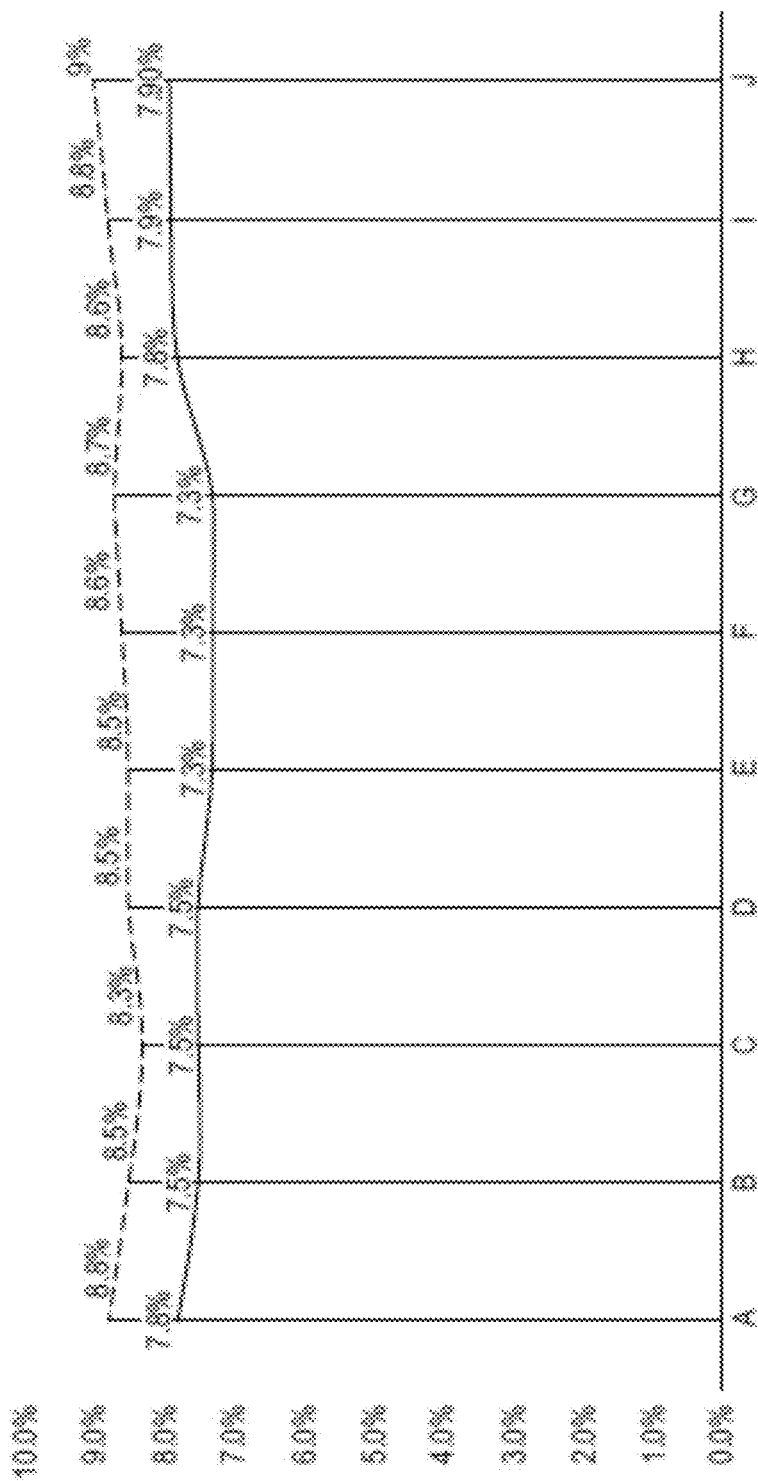
FIG. 21 shows the results of a test of a product of the invention in an artificial climate chamber.

The results of this test are shown in FIG. 21. The results in FIG. 21 show that for each of the biomass products A to J, the equilibrium moisture uptake of the biomass particles stabilized at 7 to 9 wt % after about 14 days of exposure at 27° C. and 90% relative humidity. This is a low moisture content of the biomass fuel particles and indicates that the biomass particles are highly hydrophobic and highly water resistant compared to biomass solid fuels known in the art.

Figure 22:
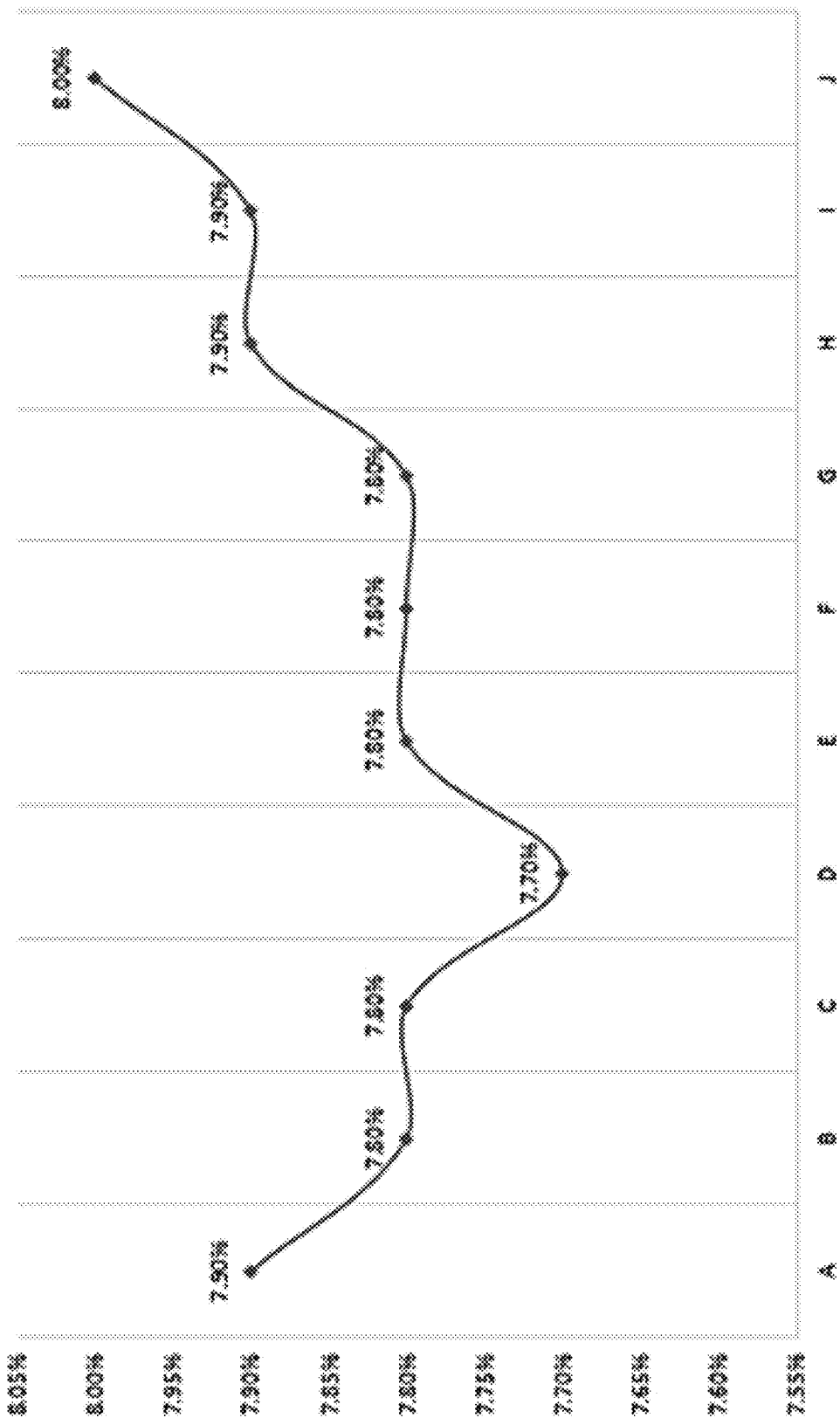
FIG. 22 shows the results of another test of a product of the invention in an artificial climate chamber.

In a second experiment in the climatic chamber, the biomass solid fuel was immersed in water for 15 minutes at a temperature of 27° C. and exposed to the climatic chamber. After immersion in water, the moisture content of the sample was 90% by weight. After 10 days of exposure in the climate chamber, the moisture content of the fuel stabilized at around 7.8% to 8%. The results are shown in FIG. 22.

The invention claimed is:

1. A process for producing a solid biomass fuel, wherein the process comprises the following steps:
   (i) providing one or more sources of biomass with an average particle diameter (D50) of from 30,000 µm to 60,000 µm and a moisture content of less than 50% by weight;
   (ii) pulverising the one or more sources of biomass to provide a pulverised biomass powder with an average particle diameter (D50) of from 1000 µm to 20,000 µm;
   (iii) compressing the pulverised biomass powder so as to provide a compressed biomass powder with a moisture content of less than 30% by weight;
   (iv) drying the compressed biomass powder so as to provide a dried compressed biomass powder;
   (v) molding the dried compressed biomass powder so as to provide a molded biomass product;
   (vi) heating the molded biomass product to a temperature of from 160° C. to 420° C. for a time period of from 0.25 to 5 hours so as to provide a solid biomass fuel; and
   (vii) removing dust particles from the solid biomass fuel, wherein the steps (i)-(vii) are carried out in sequence.

2. A process according to claim 1, wherein (i) the one or more sources of biomass comprise agricultural waste; (ii) the one or more sources of biomass comprise grass, rice husk, yam, straw, corn cob, or any combination thereof; (iii) the one or more sources of biomass comprise grass in an amount of from 20% to 80% by weight, and one or more of rice husk, yam, straw, corn cob, or any combination thereof; (iv) the one or more sources of biomass comprise grass, wherein the grass comprises a plant from the genus *Pennisetum*; (v) the one or more sources of biomass comprise *Pennisetum sinese* Roxb; or (vi) the one or more sources of biomass comprise (a) grass; (b) a mixture of rice husk and yam; (c) a mixture of straw and yam; or (d) a mixture of corn cob and yam.

3. A process according to claim 1, wherein step (i) of providing one or more sources of biomass with an average particle diameter (D50) of from 30,000 µm to 60,000 µm and a moisture content of less than 50% by weight, comprises (a) compressing the one or more sources of biomass so as to have a moisture content of less than 50% by weight; prior to (b) chopping the one or more sources of biomass so as to have an average particle diameter (D50) of from 30,000 µm to 60,000 µm.

4. A process according to claim 1, wherein the moisture content of the one or more sources of biomass is from 30% to 50% by weight.

5. A process according to claim 1, wherein step (iv) of drying the compressed biomass powder so as to provide a dried compressed biomass powder comprises drying the compressed biomass powder such that the dried compressed biomass powder has a moisture content of from 10% by weight to 18% by weight, and/or wherein step (iv) of drying the compressed biomass powder so as to provide a dried compressed biomass powder further comprises mixing the compressed biomass powder particles whilst drying.

6. A process according to claim 1, wherein step (v) of molding the dried compressed biomass powder comprises adapting the molding step such that that density of the molded biomass product is controlled, wherein adapting the molding step such that the density of the molded biomass product is controlled comprises controlling the compression ratio of a mold used in said molding step.

7. A process according to claim 1, wherein step (vi) of heating the molded biomass product is carried out for a time period of from 0.4 to 2.5 hours, wherein the step of heating the molded biomass product comprises heating the molded biomass product to a temperature of from 180° C. to 350° C., wherein step (vi) of heating the molded biomass product comprises heating the molded biomass product under conditions so as to induce torrefaction of the molded biomass product.

8. A process according to any claim 1, wherein step (vi) of heating the molded biomass product is adapted so as to control the uniformity of the solid biomass fuel, wherein adapting step (vi) so as to control the uniformity of the solid biomass fuel comprises conducting step (vi) in which the molded biomass product is rotated whilst being heated.

9. A process according to claim 1, wherein the process further comprises a step of cooling the solid biomass fuel after heating step (vi) and prior to step (vii) of removing dust particles from the solid biomass fuel.

10. A process according to claim 1, wherein step (vii) of removing dust particles from the solid biomass fuel comprises removing dust particles from the solid biomass fuel with a screen, wherein the screen has a pore size of from 3 mm to 8 mm.

11. A process according to claim 1, wherein step (vii) of removing dust particles from the solid biomass fuel comprises subjecting the solid biomass fuel to vibration, rotation, rolling, or any combination thereof.

12. A process according to claim 1, wherein the bulk density of the solid biomass fuel as determined according to DIN EN 15103 is from 0.58 kg/l to 0.8 kg/l and/or wherein the mechanical durability of the solid biomass fuel as determined according to DIN EN 15210-1 is 95% or more.

13. A process according to claim 1, wherein:
(i) the one or more sources of biomass comprise or consist essentially of grass such as a plant from the *Pennisetum* genus, and wherein the solid biomass fuel has a bulk density of from 0.60 kg/L to 0.65 kg/L, and wherein the mechanical durability of the solid biomass fuel is 95% or higher;
(ii) the one or more sources of biomass comprise a mixture of rice husk and yam, wherein the solid biomass fuel has a bulk density of from 0.58 kg/L to 0.63 kg/L, and wherein the mechanical durability of the solid biomass fuel is 95% or more;
(iii) the one or more sources of biomass comprise a mixture of straw and yam, and wherein the solid biomass fuel has a bulk density of from 0.60 kg/L to 0.64 kg/L, and wherein the mechanical durability of the solid biomass fuel is 95% or higher; or
(iv) the one or more sources of biomass comprise a mixture of corn cob and yam, and wherein the solid biomass fuel has a bulk density of from 0.62 kg/L to 0.66 kg/L, and wherein the mechanical durability of the solid biomass fuel is 95% or higher;
wherein the bulk density is determined according to DIN EN 15103, and wherein the mechanical durability is determined according to DIN EN 15210-1.

14. A process according to claim 13, wherein the plant from the Pennisetum genus is Pennisetum sinese Roxb.

15. A process according to claim 1, wherein (i) the total dry sulphur content of the biomass solid fuel is 0.15 wt % or less, wherein the total dry sulphur content is determined according to DIN EN 15289; (ii) the total dry hydrogen content of the biomass solid fuel is 5 wt % or more, wherein the total dry hydrogen content is determined according to DIN EN 15104; (iii) the total dry oxygen content of the biomass solid fuel is 36 wt % or more, wherein the total dry oxygen content is determined according to DIN EN 15296; (iv) the total dry carbon content of the biomass solid fuel is 36 wt % or more, wherein total dry carbon content is determined according to DIN EN 15104; (v) the total dry nitrogen content of the biomass solid fuel is less than 0.8 wt %, wherein the total dry nitrogen content is determined according to DIN EN 15104; and/or (vi) wherein the solid biomass fuel is waterproof for up to 20 days.

16. A process according to claim 1, wherein (i) the chemical oxygen demand (COD) of the solid biomass fuel when immersed in water is 5000 ppm or less, wherein the chemical oxygen demand is determined according to GB/11914-89; (ii) the fixed carbon content of the solid biomass fuel is 25 wt % or more, wherein the fixed carbon content is determined according to DIN EN 51734; (iii) the ash content of the solid biomass fuel is less than 20 wt %, wherein the ash content is determined according to EN 14775 at 550° C.; (iv) the volatile matter content of the solid biomass fuel is from 42 wt % to 70 wt %, wherein the volatile matter content is determined according to DIN EN 15148; and/or (v) wherein the solid biomass fuel has a moisture content of less than 8 wt %, wherein the moisture content is determined according to DIN EN 14774.

17. A process according to claim 1, wherein the biomass solid fuel has a calorific value of from 4300 kcal/kg to 6500 kcal/kg, wherein the calorific value is determined in accordance with DIN EN 14918; or wherein the bulk density of the molded biomass product is A, and the bulk density of the biomass solid fuel is B, and wherein B/A is 0.55 to 1, wherein the bulk density is determined in accordance with DIN EN 15103.

18. A process according to claim 1, wherein material derived from biomass is present in the solid biomass fuel in an amount of at least 95% by weight of the total fuel content of the solid biomass fuel.

19. A process according to claim 2, wherein the grass is a plant from the *Pennisetum* genus.

20. A process according to claim 19, wherein the plant from the *Pennisetum* genus is *Pennisetum sinese* Roxb.

21. A process for producing a solid biomass fuel, wherein the process comprises the following steps: (i) providing one or more sources of biomass with an average particle diameter (D50) of from 30,000 μm to 60,000 μm and a moisture content of less than 50% by weight; (ii) pulverising the one or more sources of biomass to provide a pulverised biomass powder with an average particle diameter (D50) of from 1000 μm to 20,000 μm; (iii) compressing the pulverised biomass powder so as to provide a compressed biomass powder with a moisture content of less than 30% by weight; (iv) drying the compressed biomass powder so as to provide a dried compressed biomass powder; (v) molding the dried compressed biomass powder by using a compression ratio of from 3.8 to 6.5 during the molding step, so as to provide a molded biomass product; (vi) heating the molded biomass product to a temperature of from 160° C. to 420° C. for a time period of from 0.25 to 5 hours so as to provide a solid biomass fuel; and (vii) removing dust particles from the solid biomass fuel, wherein the steps (i)-(vii) are carried out in sequence.

22. A process for producing a solid biomass fuel, wherein the process comprises the following steps:
(i) providing one or more sources of biomass with an average particle diameter (D50) of from 30,000 μm to 60,000 μm and a moisture content of from 30% to 50% by weight, wherein step (i) of providing one or more sources of biomass with an average particle diameter (D50) of from 30,000 μm to 60,000 μm and a moisture content of from 30% to 50% by weight, comprises (a) compressing one or more sources of biomass so as to have a moisture content of from 30% to 50% by weight; prior to (b) chopping the one or more sources of biomass so as to have an average particle diameter (D50) of from 30,000 μm to 60,000 μm;
(ii) pulverising the one or more sources of biomass to provide a pulverised biomass powder with an average particle diameter (D50) of from 1000 μm to 20,000 μm;
(iii) compressing the pulverised biomass powder so as to provide a compressed biomass powder with a moisture content of less than 30% by weight;
(iv) drying the compressed biomass powder so as to provide a dried compressed biomass powder;
(v) molding the dried compressed biomass powder so as to provide a molded biomass product;
(vi) heating the molded biomass product to a temperature of from 160° C. to 420° C. for a time period of from 0.25 to 5 hours so as to provide a solid biomass fuel; and
(vii) removing dust particles from the solid biomass fuel, wherein the steps (i)-(vii) are carried out in sequence.

* * * * *